United States Patent
Paudel et al.

(10) Patent No.: US 11,378,746 B2
(45) Date of Patent: Jul. 5, 2022

(54) RESERVOIR COMPUTING OPERATIONS USING MULTIPLE PROPAGATIONS THROUGH A MULTI-MODE WAVEGUIDE

(71) Applicant: The Aerospace Corporation, El Segundo, CA (US)

(72) Inventors: Uttam Paudel, La Palma, CA (US); George C. Valley, Los Angeles, CA (US); Marta Luengo-Kovac, La Palma, CA (US); Thomas Justin Shaw, Reston, VA (US); Matthew N. Ashner, Redondo Beach, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 0 days.

(21) Appl. No.: 17/037,486

(22) Filed: Sep. 29, 2020

(65) Prior Publication Data
US 2022/0099893 A1    Mar. 31, 2022

(51) Int. Cl.
*G02B 6/14* (2006.01)
*G02B 6/12* (2006.01)
*G06F 17/16* (2006.01)

(52) U.S. Cl.
CPC ............... *G02B 6/14* (2013.01); *G02B 6/12* (2013.01); *G02B 2006/1213* (2013.01); *G06F 17/16* (2013.01)

(58) Field of Classification Search
None
See application file for complete search history.

(56) References Cited

U.S. PATENT DOCUMENTS

| | | | |
|---|---|---|---|
| 8,026,837 B1 | 9/2011 | Valley et al. | |
| 8,902,096 B2 | 12/2014 | Valley et al. | |
| 9,413,372 B1 | 8/2016 | Valley et al. | |
| 10,095,262 B2 | 10/2018 | Valley et al. | |
| 10,627,849 B1 | 4/2020 | Scofield et al. | |
| 11,017,309 B2 * | 5/2021 | Roques-Carmes | .. G06N 3/0454 |

OTHER PUBLICATIONS

Agrawal, "Gain nonlinearities in semiconductor lasers: Theory and application to distributed feedback lasers," IEEE Journal of Quantum Electronics 23(6): 860-868 (1987).

(Continued)

*Primary Examiner* — Chad H Smith
(74) *Attorney, Agent, or Firm* — Snell & Wilmer LLP

(57) ABSTRACT

A method for performing an operation on an input signal includes receiving, by a multi-mode waveguide, the input signal imposed on laser light. The received input signal imposed on the laser light is propagated through the waveguide a plurality of times in a plurality of modes, the modes interfering each time they propagate through the waveguide to generate an interference pattern of the plurality of modes. Portions of the interference pattern of the plurality of modes are nonlinearly activated each time those modes propagate through the multi-mode waveguide. Portions of the activated interference pattern of the plurality of modes are output to an optical detector array in parallel with one another each time those modes propagate through the multi-mode waveguide.

22 Claims, 12 Drawing Sheets
(2 of 12 Drawing Sheet(s) Filed in Color)

(56) References Cited

OTHER PUBLICATIONS

Borlaug et al., "A photonic integrated circuit based compressive sensing radio frequency receiver," Proceedings IEEE Summer Topical Meetings, Cabo, Mexico (2020).
Desurvire et al., "Gain saturation effects in high-speed, multichannel erbium-doped fiber amplifiers at lambda=1.53 µm," Journal of Lightwave Technology 7(12): 2095-2104 (1989).
Doany et al., "A four-channel silicon photonic carrier with flip-chip integrated semiconductor optical amplifier (SOA) array providing >10-dB gain," 2016 IEEE 66th Electronic Components and Technology Conference (ECTC), Las Vegas, NV: 1061-1068 (2016).
Dong et al., "Scaling up echo-state networks with multiple light scattering," 2018 IEEE Statistical Signal Processing Workshop (SSP): 448-452 (Jun. 2018).
Dong et al., "Optical reservoir computing using multiple light scattering for chaotic systems prediction," IEEE Journal of Selected Topics in Quantum Electronics 26(1): 7701012, 12 pages (2020).
Giles et al., "Modeling erbium-doped fiber amplifiers," Journal of Lightwave technology 9(2): 271-283 (1991).
Inoue et al., "Gain saturation dependence on signal wavelength in a travelling-wave semiconductor laser amplifier," Electronics Letters 23(7): 328-329 (1987).
Jaskorzynska et al., "Gain saturation and pump depletion in high-efficiency distributed-feedback rare-earth-doped lasers," Optics letters 21(17): 1366-1368 (1996).
Jones et al., "Ultra-low crosstalk, CMOS compatible waveguide crossings for densely integrated photonic interconnection networks," Optics Express 21(10): 12002-12013 (2013).
Keyvaninia et al., "A highly efficient electrically pumped optical amplifier integrated on an SOI waveguide circuit," The 9th International Conference on Group IV Photonics (GFP), San Diego, CA: 222-224 (2012).
Li et al., "Multimode silicon photonics," Nanophotonics 8(2): 227-247 (2019).
Matsumoto et al., "Hybrid-integration of SOA on silicon photonics platform based on flip-chip bonding," Journal of Lightwave Technology 37(2): 307-313 (2019).
Miscuglio et al., "All-optical nonlinear activation function for photonic neural networks," Optical Materials Express 8(12): 3851-3863 (2018).
Mukai et al., "Signal gain saturation in two-channel common amplification using a 1.5 µm InGaAsP travelling-wave laser amplifier," Electronics letters 23(8): 396-397 (1987).
Paschotta et al., "Passive mode locking with slow saturable absorbers," Appl. Phys. B 73: 653-662 (2001).
Pathak et al., "Model-free prediction of large spatiotemporally chaotic systems from data: A reservoir computing approach" Physical review letters 120(2): 024102 (2018).
Paudel et al., "Classification of time-domain waveforms using a speckle-based optical reservoir computer," Optics Express 28(2): 1225-1237 (2020).
Piels et al., "Compact silicon multimode waveguide spectrometer with enhanced bandwidth," Scientific Reports 7: 43454 (2017).
Rafayelyan et al., "Large-scale optical reservoir computing for spatiotemporal chaotic systems prediction," arXiv:2001.09131 (2020).
Rönn et al., "Ultra-high on-chip optical gain in erbium-based hybrid slot waveguides," Nature Communications 10: article No. 432 (2019).
Schrauwen et al., "An overview of reservoir computing: theory, applications and implementations," ESANN '2007 proceedings—European Symposium on Artificial Neural Networks, Bruges, Belgium, Apr. 25-27, 2007, pp. 471-482, ISBN 2-930307-07-2.
Tanaka et al., "Recent advances in physical reservoir computing: A review," Neural Networks 115: 100-123 (2019).
Valley et al., "Multimode waveguide speckle patterns for compressive sensing," Optics Letters 41: 2529-2532 (2016).
Van der Sande et al., "Advances in photonic reservoir computing," Nanophotonics 6(3): 561-576 (2017).
Vlachas et al., "Forecasting of spatio-temporal chaotic dynamics with recurrent neural networks: A comparative study of reservoir computing and backpropagation algorithms," arXiv preprint arXiv:1910.05266 (2019).
Vlachas et al., "Data-driven forecasting of high-dimensional chaotic systems with long short-term memory networks," Proceedings of the Royal Society A: Mathematica, Physical and Engineering Sciences 474(2213): 20170844 (2018).
Yin et al., "31GHz Ge n-i-p waveguide photodetectors on Silicon-on-Insulator substrate," Optics Express, 15(21): 13965-13971 (2007).
Yu et al., "The 650-nm variable optical attenuator based on polymer/silica hybrid waveguide," Chinese Physics B 25(5): 054101 (2016).
Yu et al., "Silicon chip-scale space-division multiplexing: from devices to system," Science China Information Sciences 61: 080403 (2018).

\* cited by examiner

RESERVOIR COMPUTING OPERATIONS USING MULTIPLE PROPAGATIONS THROUGH A MULTI-MODE WAVEGUIDE

BACKGROUND

Reservoir computing is a recently developed class of machine learning, and can be useful for time domain applications. Reservoir computing techniques can include performing matrix operations, such as matrix multiplication and applying nonlinear functions to matrix elements. However, when matrix dimensions can be on the order of 1000s by 100000s or more, the matrix operations can take a significant amount of computational time and power.

SUMMARY

Embodiments of the present invention provide reservoir computing operations using multiple propagations through a multi-mode waveguide.

Under one aspect, a method is provided for performing an operation on an input signal. The method may include receiving, by a multi-mode waveguide, the input signal imposed on laser light. The method may include propagating the received input signal imposed on the laser light through the waveguide a plurality of times in a plurality of modes, the modes interfering each time they propagate through the waveguide to generate an interference pattern of the plurality of modes. The method may include nonlinearly activating portions of the interference pattern of the plurality of modes each time those modes propagate through the multi-mode waveguide. The method may include outputting activated portions of the interference pattern of the plurality of modes to an optical detector array in parallel with one another each time those modes propagate through the multi-mode waveguide.

In some examples, the nonlinear activation comprises nonlinear attenuation performed by a saturable optical attenuation medium. In some examples, the nonlinear activation comprises nonlinear gain performed by a saturable optical gain medium.

In some examples, the nonlinear activation is performed using a dopant within the multi-mode waveguide.

In some examples, the nonlinear activation is performed using a crystal spliced to the multi-mode waveguide.

In some examples, the nonlinear activation comprises second harmonic generation or two-photon absorption. In some examples, the multi-mode waveguide comprises a planar waveguide.

In some examples, the multi-mode waveguide comprises a multi-mode fiber.

In some examples, the portions outputted to the optical detector array map the input signal into a higher dimensional space.

In some examples, the input signal extends over a time period longer than the time it takes for the modes to propagate once through the multi-mode waveguide.

In some examples, the plurality of modes comprises greater than 10 modes.

Under another aspect, an apparatus is provided for performing an operation on an input signal. The apparatus may include a multi-mode waveguide configured to receive the input signal imposed on laser light. The waveguide further may be configured to propagate the received input signal imposed on the laser light through the waveguide a plurality of times in a plurality of modes, the modes interfering each time they propagate through the waveguide to generate an interference pattern of the plurality of modes. The apparatus further may include a nonlinear optical medium configured to nonlinearly activate portions of the interference pattern of the plurality of modes each time those modes propagate through the multi-mode waveguide. The apparatus further may include an optical detector array configured to receive output activated portions of the interference pattern of the plurality of modes to in parallel with one another each time those modes propagate through the multi-mode waveguide.

In some examples, the nonlinear optical medium comprises a saturable optical attenuation medium.

In some examples, the nonlinear optical medium comprises a saturable optical gain medium.

In some examples, the nonlinear optical medium comprises a dopant within the multi-mode waveguide.

In some examples, the nonlinear optical medium comprises a crystal spliced to the multi-mode waveguide.

In some examples, the nonlinear activation medium comprises a second harmonic generation medium or two-photon absorption medium.

In some examples, the multi-mode waveguide comprises a planar waveguide.

In some examples, the multi-mode waveguide comprises a multi-mode fiber.

In some examples, the portions outputted to the optical detector array map the input signal into a higher dimensional space.

In some examples, the input signal extends over a time period longer than the time it takes for the modes to propagate once through the multi-mode waveguide.

In some examples, the plurality of modes comprises greater than 10 modes.

BRIEF DESCRIPTION OF DRAWINGS

The patent or application file contains at least one drawing executed in color. Copies of this patent or patent application publication with color drawing(s) will be provided by the Office upon request and payment of the necessary fee.

DETAILED DESCRIPTION

Reservoir computers (RCs) may capture and predict features of complex, nonlinear temporal dynamics through dimensionality expansions. Among other things, RCs may be used for processing time-domain signals such as audio, video or radio-frequency waveforms, or performing functions such as replication, classification, prediction, and denoising. Unlike conventional recurrent neural networks (RNNs), the internal weights in an RC are fixed and given by pseudo-random numbers while output weights are trained. This simplification gives RCs an advantage in terms of lower power consumption and higher processing speed, as compared to conventional RNNs. Provided herein is a photonic RC circuit that uses optical feedback in a multi-mode waveguide to perform operations. The photonic RC circuit provided herein may provide a platform for low-power, high speed (e.g., nanosecond) real-time processing capabilities, and may be suitable for a wide range of problems such as speech recognition, time series prediction, signal classification, blind signal separation, control system, denoising, demodulation, and the like. In some examples, the present RC circuits combine optical feedback with optical speckle in a multi-mode waveguide, together with use of a non-linear optical (NLO) medium, to perform operations such as matrix multiplications and applying non-linearities to matrix elements in the optical domain using a multi-mode waveguide.

Figures 13A, 13B:
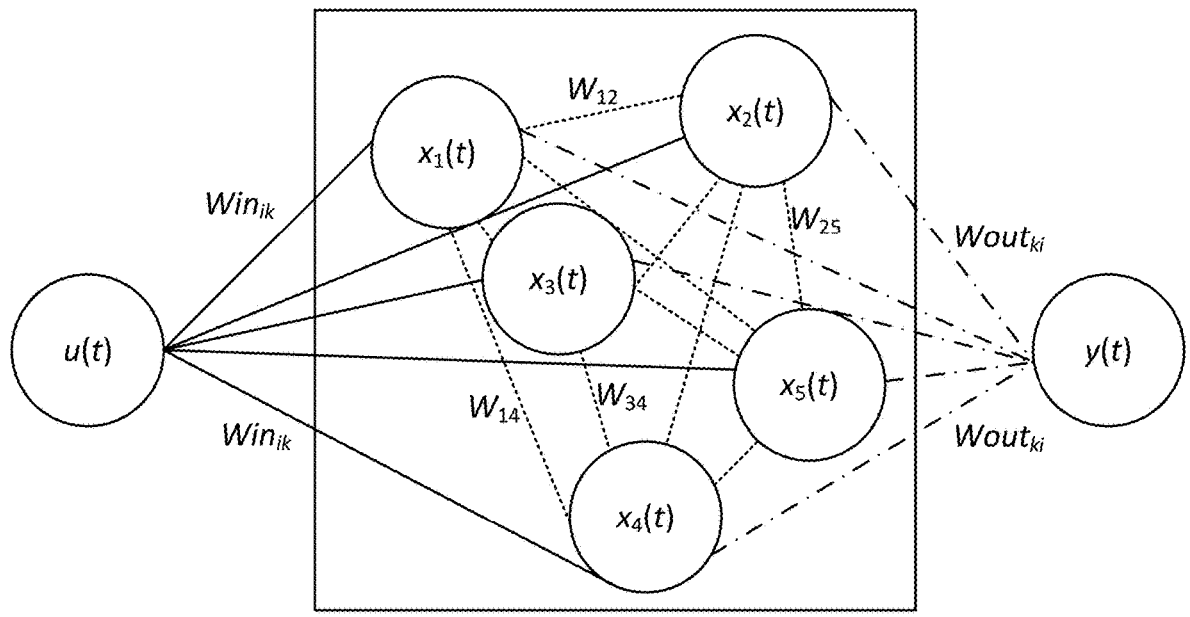
FIG. 13A schematically illustrates a representation of a prior art reservoir computing network.
FIG. 13B schematically illustrates operations that may be performed by the present reservoir computing circuits or by prior art reservoir computing networks.

FIG. 13A schematically illustrates a representation of a prior art reservoir computing network. In it, multi-variate input u(t) of dimension k are connected to each of the "neurons" $x_i(t)$ of the network with input coefficients $Win_{ik}$. Within the network of neurons, each neuron $x_i(t)$ is connected to other neurons with network coefficients $W_{ij}$. Additionally, each of the neurons $x_i(t)$ in the network is related to multi-variate outputs y(t) of dimension m with output coefficients $Wout_{ki}$. Note that the time-varying values of the neurons $x_i(t)$ can be expressed as a column vector x(t) of size n×1, the values of the input coefficients $Win_{ik}$ can be expressed as a matrix Win of size n×k, the values of the network coefficients $W_{ij}$ can be expressed as a square matrix W of size n×n, and the values of the output coefficients $Wout_{ki}$ can be expressed as a matrix Wout of size k×n.

One aspect of such a reservoir computing network is that the input coefficients $Win_{ik}$ and network coefficients $W_{ij}$ are random and fixed. The only training required for such a reservoir computing network takes place at the output coefficients $Wout_{ki}$, which are adjusted to produce the desired system response. FIG. 13B schematically illustrates operations that may be performed by the present reservoir computing circuits or by prior art reservoir computing networks, for example by adjusting the values of output coefficients $Wout_{ki}$. This operation follows discrete time steps t by using the formula illustrated in FIG. 13B which may be expressed as:

$$x(t+1)=f_{NL}(W \cdot x(t)+Win \cdot u(t)) \quad (1)$$

$$y(t)=Wout \cdot x(t) \quad (2).$$

In equation (1), $f_{NL}(\ )$ is a nonlinear activation function which is sufficiently nonlinear over the range of values produced by the network. A commonly used nonlinear activation function is the hyperbolic tangent, tan h( ). However, many other nonlinear functions can achieve the desired result. For further details of reservoir computing and nonlinear activation functions, see Schrauwen et al., "An overview of reservoir computing: theory, applications and implementations," ESANN '2007 proceedings—European Symposium on Artificial Neural Networks, Bruges, Belgium, 25-27 Apr. 2007, pages 471-482, ISBN 2-930307-07-2, the entire contents of which are incorporated by reference herein. For further details of exemplary nonlinear functions that can be used in reservoir computing, see Dong et al., "Scaling up echo-state networks with multiple light scattering," 2018 *IEEE Statistical Signal Processing Workshop (SSP)*: 448-452 (June 2018), the entire contents of which are incorporated by reference herein.

Similar to other machine learning operations, most of the computational cost in a reservoir computing network such as illustrated in FIG. 13A implementing an operation such as illustrated in FIG. 13B and expressed in equations (1) and (2) occurs in the matrix multiplications at each step, which computational cost can be relatively large. In particular, the operation W·x(t) between the n×n matrix W and the n×1 column vector x(t) represent most of the computational cost. In exemplary electronics, evaluating this matrix product W·x(t) may mean performing $O(n^2)$ operations or more, which can carry an estimated energy cost of about 1 pJ/operation. For large multivariate input signals, such as video, the operation Win·u(t) may represent significant computational cost as well. As used herein, the term "about" means within an order of magnitude of the stated value. For commercial electronic integrated circuits (ICs) which process 128×128 matrices, this can result in power dissipation on the order of 50 W at 3 GHz clock frequency, not including data transfer and supporting subsystems which can increase the total system power by a factor of ten. In comparison, and as described in greater detail herein, the present reservoir computing circuits may perform O(n) operations at an estimated energy cost of about 100 fJ/operation, resulting in a comparable power dissipation of 40 mW for the same matrix size and clock frequency as the example provided for commercial electronic ICs—a power dissipation savings of several orders of magnitude. Because the present RC circuits may perform O(n) operations, this performance improvement (power dissipation savings) can scale with the number of neurons in the network. Indeed, as one example a 4× increase in neurons may provide an additional order of magnitude reduction in power consumption relative to an electronic IC with the same number of neurons. Further-more, the present RC circuits may operate at speeds above one GHz (e.g., from about 2 to about 100 GHz, or from about 5 to about 50 GHz, or from about 10 to about 20 GHz), and therefore potentially can compute matrix operations an order of magnitude faster, enabling new applications in the RF domain which electronic ICs cannot address.

Figure 1:
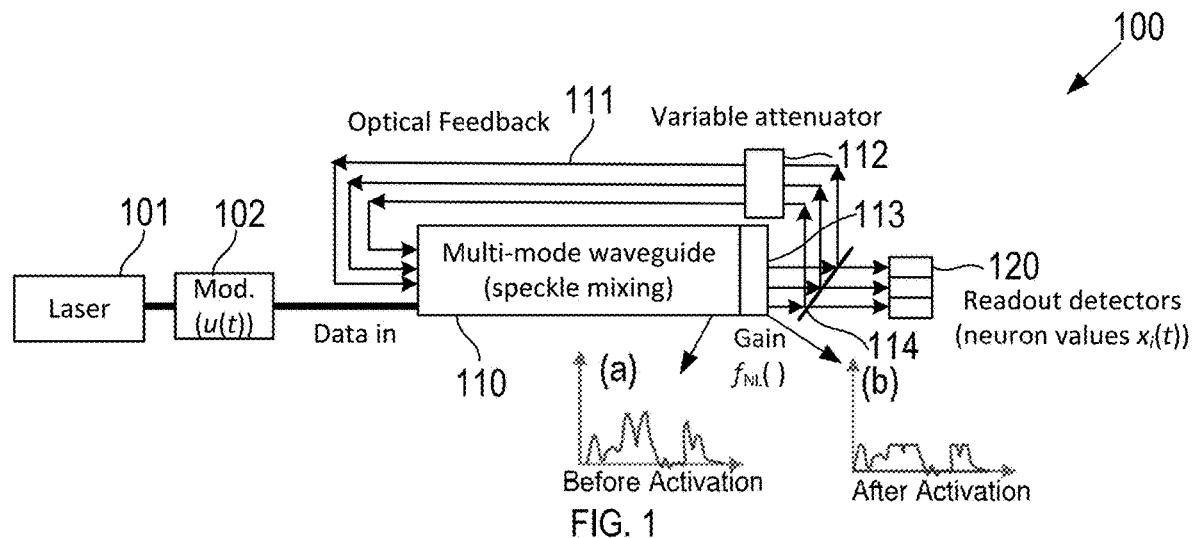
FIG. 1 schematically illustrates components of a reservoir computing circuit including a multi-mode waveguide having multiple propagations therethrough, according to one exemplary configuration.

For example, FIG. 1 schematically illustrates components of a reservoir computing circuit 100 (RC circuit) including multi-mode waveguide 110 having multiple propagations therethrough, according to one exemplary configuration. RC circuit 100 may be configured to perform an operation on an input signal, e.g., a reservoir computing operation such as described elsewhere herein, or otherwise known in the art.

RC circuit 100 may include laser 101 configured to generate laser light, and modulator (Mod.) 102 configured to impose time-varying input signal u(t) on the laser light. Laser 101 may include a continuous wave, single-frequency laser, or may include a pulsed laser. Modulator 102 may include any suitable intensity and/or phase modulator, such as an electro-optic modulator, e.g., Mach Zehnder modulator. Other modulators, such as absorptive modulators based on the Franz-Keldysh effect or the quantum confined Stark effect, on-off keying, or other interferometric modulators, or resonant cavity modulators such as microring resonators, also suitably may be used. Examples such as shown in FIG. 1 may include a single modulator, and as such the input signal may be considered to have a single dimension. In other examples, such as described with reference to FIG. 4, 5, or 6, an RC circuit may include multiple modulators or arrays of modulators such as spatial light modulators imposing respective time varying input signal(s) on laser light, and such input signal(s) may be considered to have the same dimensions as the number of modulators. The input signal may be received from any suitable signal source that need not necessarily be considered to be part of RC circuit 100. For example, the input signal may be received via any suitable wired or wireless signaling pathway from a separate signal source (not specifically illustrated). Example input signal sources may include, but are not limited to, radar systems, communication systems, data processing, brain-machine interfaces, video systems, and robotics. For further example sources of input signals, see Schrauwen et al., "An overview of reservoir computing: theory, applications and implementations," ESANN'2007 proceedings—European Symposium on Artificial Neural Networks, Bruges, Belgium, 25-27 Apr. 2007: pages 471-482, ISBN 2-939397-07-01, the entire contents of which are incorporated by reference herein.

Multi-mode waveguide 110 is configured to receive the input signal imposed on the laser light, and to propagate the received input signal imposed on the laser light through the waveguide a plurality of times in a plurality of modes, e.g., 10 or more modes, 20 or more modes, 50 or more modes, or 100 or more modes. The modes interfere each time they propagate through the waveguide 110, generating an interference pattern. For example, multi-mode waveguide 110 may generate a random optical speckle pattern at the output of the waveguide due to different propagation constants of transverse optical modes within the waveguide. Optical feedback structure 111 feeds the optical output of multi-mode waveguide 110 back into the waveguide, such that the light may propagate through the waveguide a plurality of times. Each of the modes may be fed back into multi-mode waveguide 110 using optical feedback structure 111. Note that in some examples, optical feedback structure 111 may be provided as a part of multi-mode waveguide 110. The interference pattern, e.g., optical speckle pattern, that results from the multiple propagations through multi-mode waveguide 110 corresponds to the products of the matrix multiply W·x(t) in equation 1. By "multi-mode waveguide" it is meant a passive optical element that supports a plurality of electromagnetic propagation modes for light that is input thereto from different physical locations, in which different of such propagation modes coherently interfere with one another so as to produce a speckle pattern. By "speckle pattern" it is meant an irregular, aperiodic pattern in which at least a first portion of the pattern includes an optical intensity profile that is different than an optical intensity profile of at least a second portion of the pattern that is spatially separated from the first portion of the pattern. By "optical intensity profile" it is meant the respective intensities (amplitudes) of the light in different regions of space. For further details regarding generation of random optical speckle patterns using multi-mode waveguides, see Valley et al., "Multimode waveguide speckle patterns for compressive sensing," Optics Letters 41: 2529-2532 (2016), the entire contents of which are incorporated by reference herein. In various configurations, multi-mode waveguide 110 can include a planar waveguide such as described with reference to FIGS. 2, 4, and 5, or can include a multi-mode fiber such as described with reference to FIGS. 3 and 6.

RC circuit 100 also may include variable attenuator 112 which is configured to adjust the level of the optical power fed back into the multimode waveguide 110 and which adjusts a hyperparameter of the reservoir computer for improved or optimal performance. Variable attenuator 112 may be disposed within multi-mode waveguide 110 in a manner such as described with reference to FIG. 2, 4, or 6, or may be disposed within optical feedback structure 111 in a manner such as described with reference to FIG. 3 or 5.

RC circuit 100 also may include NLO medium 113 configured to nonlinearly activate portions of the interference pattern of the plurality of modes each time those modes propagate through the multi-mode waveguide, e.g., to apply nonlinear function $f_{NL}(\ )$. Such nonlinear functions may, in some examples, have the shape of a sigmoid, but the exact shape of the sigmoid may be generally unimportant as discussed in Schrauwen et al. In some examples, the nonlinear activation function may include a rectifier-type activation function. The nonlinear activation, e.g., sigmoidal-shape or rectifier-type activation, by NLO medium 113 may include optical implementations such as nonlinear attenuation, or nonlinear gain. For example, the NLO medium 113 may include a saturable optical attenuation medium (which also may be referred to as a saturable absorber), or may include a saturable optical gain medium. Illustratively, for relatively small signal gain, then the output increases linearly with more input power for a fixed gain power, whereas near the gain saturation regime, the output flattens with respect to input power, since more gain may not be extracted without increasing the pump power. Thus, a saturating gain medium may exhibit sigmoidal type behavior and the slope→0 as intensity goes to infinity.

Figure 2:
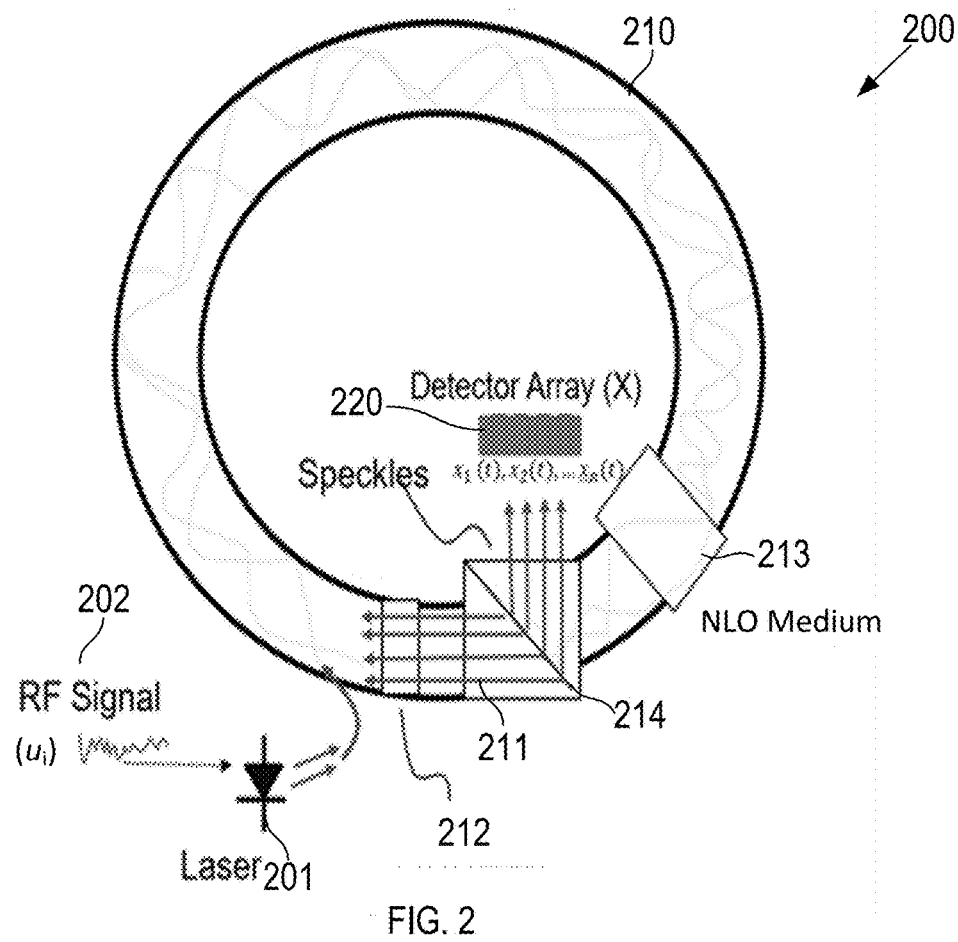
FIG. 2 schematically illustrates components of another reservoir computing circuit including a multi-mode waveguide having multiple propagations therethrough, according to one exemplary configuration.

NLO medium 113 may be implemented within RC circuit 100 in any suitable manner, e.g., may include a dopant within the multi-mode waveguide in a manner such as described with reference to FIG. 3, or may include a crystal spliced to the multi-mode waveguide in a manner such as described with reference to FIG. 2 or 4. A sigmoidal-shape activation function may be optically implemented, illustratively, using depletion via a second harmonic generation (SHG) or 2-photon absorption medium. Activation functions with performance similar to the rectified linear unit may be optically implemented, illustratively, using quantum dots and C60 by Miscuglio et al., "All-optical nonlinear activation function for photonic neural networks," *Optical Materials Express* 8(12): 3851-3863 (2018), the entire contents of which are incorporated by reference herein. For other non-limiting examples of NLO media, see the following references, the entire contents of each of which are incorporated by reference: Paschotta, "Saturable absorbers," Encyclopedia of Laser Physics and Technology (2015); Mukai et al., "Signal gain saturation in two-channel common amplification using a 1.5 µm InGaAsP travelling-wave laser amplifier," Electronics letters 23(8): 396-397 (1987); Agrawal, "Gain nonlinearities in semiconductor lasers: Theory and application to distributed feedback lasers." IEEE Journal of Quantum Electronics 23(6): 860-868 (1987); Giles et al., "Modeling erbium-doped fiber amplifiers," Journal of Lightwave technology 9(2): 271-283 (1991); and Rönn et al., "Ultra-high on-chip optical gain in erbium-based hybrid slot waveguides," Nature Communications 10: article no. 432 (2019). It will be appreciated that any other suitable nonlinear activation function may be applied by an appropriate NLO medium.

Illustratively, inset (a) of FIG. 1 is an example plot of the intensity of the light in the waveguide as a function of position prior to entering the NLO medium 113, and inset (b) is an example plot of the intensity as a function of position after propagating through NLO medium 113, e.g., a saturable optical gain medium, second harmonic generation medium, or two-photon absorption medium, which are examples of NLO media suitable for use in RC circuit 100. It may be seen from inset (b) that NLO medium 113 attenuates the intensity at positions where it exceeds a threshold and this in turn modifies the modal expansion coefficients appropriately for the functioning of the RC. Referring back to equation (1), $Win_{ik}$ may be implemented by the propagation in the multimode waveguide just as Wij is implemented. The input signal u(t) may be injected with a certain spatial pattern that corresponds to a set of modes while the feedback nonlinearly activated x(t) is re-injected with a different spatial pattern and a different set of modes.

RC circuit 100 also may include optical detector array 120 configured to receive activated portions of the interference pattern of the plurality of modes in parallel with one another each time those modes propagate through the multi-mode waveguide 110. For example, optical feedback structure 111 of RC circuit 100 may include outcoupler 114 that is configured to transmit a portion of the plurality of modes to detector array 120, and to recirculate another portion of the plurality of modes back into multi-mode waveguide 110. Outcoupler 114 may include a beamsplitter or grating coupler such as described with reference to FIGS. 2, 3, and 4, or may include another type of optical output structure such as described with reference to FIG. 5 or 6. The portions that are outputted to different portions of the optical detector array 120 correspond to different elements $x_i(t)$, and may include echoes of the input signal. For example, a given dimensionally expanded temporal segment of the input signal may circulate through multi-mode waveguide several times, and each time a portion of that segment may be received by detector array 120. On a first pass of the modes through multi-mode waveguide 110, the vector x(1) includes the dimensionality expansion of u(1). On a second pass of the modes through multi-mode waveguide 110, the vector x(2) includes the dimensionality expansion of u(2) mixed with some of the expansion x(1) of u(1) (e.g., an "echo" of x(1)). After multiple (n) passes, the vector x(n) includes information on u(i), u(i−1), u(i−2), and so forth all the way back to u(1) (e.g., additional "echoes" all the way back to x(1)). The nonlinear function applied by NLO medium 113 also distorts the modes each round trip. As such, the information in each echo may show up at different locations within optical detector array 120. This may provide indirect information about how many round trips each of the echoes has made. The information in x(1), x(2), . . . x(n) is measured by optical detector array 120, formatted as a matrix, and used to compute the output weight matrix Wout in a manner consistent with known reservoir computing techniques.

In some configurations, the individual optical detectors of array 120 receive different portions of a speckle pattern output by waveguide 110 and as such may be considered to correspond to the "neurons" of RC circuit 100, and generate respective electrical signals based on the received portions. Optionally, amplifiers (not specifically illustrated) are configured to amplify the electrical signals generated by optical detector array 120. Optical detector array 120, and any ADCs that follow detector array 120, may be configured so as to have a response time that is suitably fast to detect changes in x(t). The input signal may extend over a time period longer than the time it takes for the modes to propagate once through the multi-mode waveguide, or may extend over a time period that is the same or about the same as the time it takes for the modes to propagate once through the multi-mode waveguide, or may extend over a time period that is shorter than the time it takes for the modes to propagate once through the multi-mode waveguide.

For example, the round-trip time of the input signal through multi-mode waveguide 110 and optical feedback structure 111 may correspond to the sample time of input signal u(t). As such, at t=0, the input signal is turned on, modulator 102 imposes the input signal onto the light from laser 101, this laser light activates a plurality of spatial modes of waveguide 110, and the spatial modes begin a first round trip through multi-mode waveguide 110, NLO medium 113 and optical feedback structure 111 which generates a speckle pattern x(0) of the input spatial modes modulated by u(0) and mixed by the NLO medium 113 which causes reweighting of the modes. At t=1, corresponding to a first round-trip time, the input signal is updated to u(1) such that a new plurality of spatial modes propagates around the waveguide and through the NLO medium simultaneously with the plurality of modes that generated the speckle pattern x(0) of u(0), such that optical detector array 120 receives speckle pattern x(1), which contains information about u(1) and u(0), that is transmitted by outcoupler 114. At t=2, corresponding to a second round-trip time, the amplitudes of the input signal modes are updated to u(2) such that a third plurality of spatial modes propagate around the waveguide and through the NLO medium 113 and interfere with the speckle pattern x(1) of u(0) and u(1), such that optical detector array receives x(2), which contains information about u(0), u(1) and u(2), that is transmitted by outcoupler 114. As such, the action of the speckle mixing in the multimode waveguide 110 and the NLO medium 113 maps the input signal to a higher dimensional space that is received by optical detector array 120, and stabilizes RC circuit 100. For further details regarding mapping to a higher dimensional space, which also may be referred to as expanding dimensionality, see Tanaka et al., "Recent advances in physical reservoir computing: A review," Neural Networks 115: 100-123 (2019). Optical detector array 120 may be one-dimensional or two-dimensional, and in some examples may have greater than 10 million pixels, e.g., greater than 50 million pixels, e.g., greater than 100 million pixels. The output of optical detector array 120 corresponds to a vector of neurons at each time point that is provided to a computer and processed.

The particular configuration and width or diameter of the multi-mode waveguide may determine the number of modes that propagate therethrough. For example, FIG. 2 schematically illustrates components of another RC circuit 200 including a multi-mode waveguide having multiple propagations therethrough, according to one exemplary configuration. In the configuration shown in FIG. 2, the multi-mode waveguide includes planar waveguide 210 which may allow RC circuit 200 to be implemented in a relatively small area for example using silicon-on-insulator (SOI) or indium phosphide (InP) technology. Multi-mode waveguide 210 may, for example, include a buried waveguide, diffused waveguide, ridge/wire waveguide, strip-loaded waveguide, arrow waveguide, rib waveguide, or the like. Illustratively, planar waveguide 210 may have a length of about 10 cm or less, or about 5 cm or less, or about 2 cm or less, allowing the entire RC circuit 200 to be implemented in an area of about 5 cm$^2$ or less, or about 2 cm$^2$ or less, or about 1 cm$^2$ or less. Planar waveguide 210 may have a width of about 5 microns to 1000 microns, e.g., about 10 microns to 500 microns, e.g., about 50 microns to 100 microns. Planar waveguide 210 may have a thickness of about 50 nm to 100 microns, e.g., about 100 nm to 50 microns, e.g., about 200 nm to 10 microns, e.g., about 200 nm to 5 microns, e.g., about 500 nm to 1 microns. Planar waveguide 210 may be at least partially circular, or may be at least partially oval shaped, or may have any other suitable shape or combination of shapes. Planar waveguide 210 may support at least about 10 modes, at least about 20 modes, at least about 50 modes, or at least about 100 modes. In one example using SOI technology, planar waveguide 210 may have a thickness of about 220 nm to about 5 microns, a width of about 50 microns to 1000 microns, and may include an oxide cladding (SiO$_2$) having non-zero thickness (e.g., 1-2 microns) or an air cladding. For a nonlimiting example of a planar waveguide that may be included in RC circuit 200, see Borlaug et al., "A photonic integrated circuit based compressive sensing radio frequency receiver," Proceedings IEEE Summer Topical Meetings, Cabo, Mexico (2020), the entire contents of which are incorporated by reference herein.

RC circuit 200 may include laser 201 configured to generate laser light, and modulator 202 configured to impose a time-varying input signal u(t) on the laser light. Laser 201 may include a continuous wave, single-frequency laser, or may include a pulsed laser. Modulator 202 may include any suitable intensity and/or phase modulator, such as an electro-optic modulator. Similarly, as described with reference to FIG. 1, imposing the signal on the laser light using a single modulator may be considered to provide a single-dimension input signal. Alternatively, in a manner such as described with reference to FIG. 4 or 5, multiple modulators may impose signal(s) on the laser light so as to provide a multiple-dimension input signal. For a nonlimiting example of a laser and modulator that may be included in RC circuit 200, see Piels et al., "Compact silicon multimode waveguide spectrometer with enhanced bandwidth," Scientific Reports 7: 43454 (2017), the entire contents of which are incorporated by reference herein.

Planar waveguide 210 is configured to receive the input signal imposed on the laser light, and to propagate the received input signal imposed on the laser light through the waveguide a plurality of times in a plurality of modes that each time they propagate through the waveguide 210, in a manner similar to that described with reference to FIG. 1. Optical feedback structure 211, which may include beamsplitter 214, feeds the optical output of planar waveguide 210 back into the waveguide, such that the light may propagate through the waveguide a plurality of times in a plurality of modes, and outcouples a portion of the plurality of modes that interfere to form a speckle pattern on detector array 220. Each of the pixels on the detector array may correspond to a neuron of RC circuit 200. The modes that are fed back into the planar waveguide 210 using optical feedback structure 211 mix with the new modes modulated by the input signal for the next time step. In some examples, beamsplitter 214 may include an unbalanced 99/1, 90/10, 80/20, or 60/40 beamsplitter, or a 50/50 or Y-splitters. For chip scale implementation, such waveguides can be built in single modes where one multi-mode input gets read in N single mode waveguide and the non-linearly is applied to those N single mode waveguides, spilt with an integrated beam-splitter array where part of the light goes to the readout detectors and the other part acts as feedback neurons.

RC circuit 200 also may include variable attenuator 212 which may be disposed within planar waveguide 210 to control the relative intensity of modes that have propagated through the waveguide and input modes modulated by a new value of u(t). RC circuit 200 also may include NLO medium 213 configured to nonlinearly activate portions of the interference pattern of the plurality of modes each time those modes propagate through the multi-mode waveguide 210. In the illustrated example, NLO medium 213 includes a saturable optical gain medium, such as a semiconductor optical amplifier (SOA). The SOA may include a crystal spliced to planar waveguide 210. Other example NLO activation media include a rare-earth dopant provided within planar waveguide 210, a saturable absorber fabricated by coating the waveguide cross-section with 2D materials with two-photon absorption or other non-linear behavior, or the like. Illustratively, the SOA (or other saturable optical gain medium) 213, beamsplitter 214, and variable attenuator 212 may be flip-bond mounted onto a photonic integrated circuit including planar waveguide 210, laser 201, and modulator 202. Such devices may be built using PDK (process design kit) or heterostructure growth using standard fabrication processes. The action of propagation through waveguide 210 and nonlinear gain medium 213 mixes the modes and stabilizes RC circuit 200. The output of optical detector array 220 is provided to a computer and processed using methods well known in the art such as described by Tanaka et al. referenced above.

Figure 3:
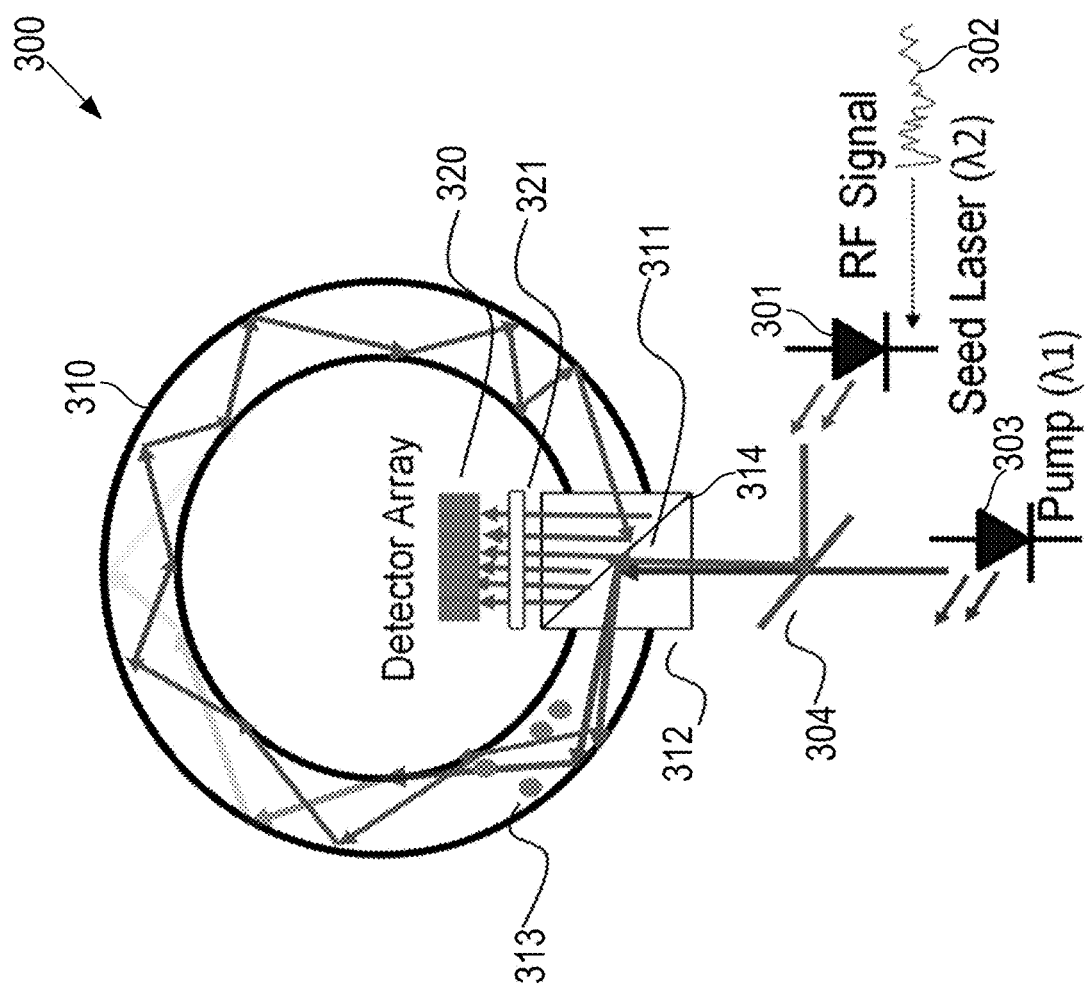
FIG. 3 schematically illustrates components of another reservoir computing circuit including a multi-mode waveguide having multiple propagations therethrough, according to one exemplary configuration.
Figure 4:
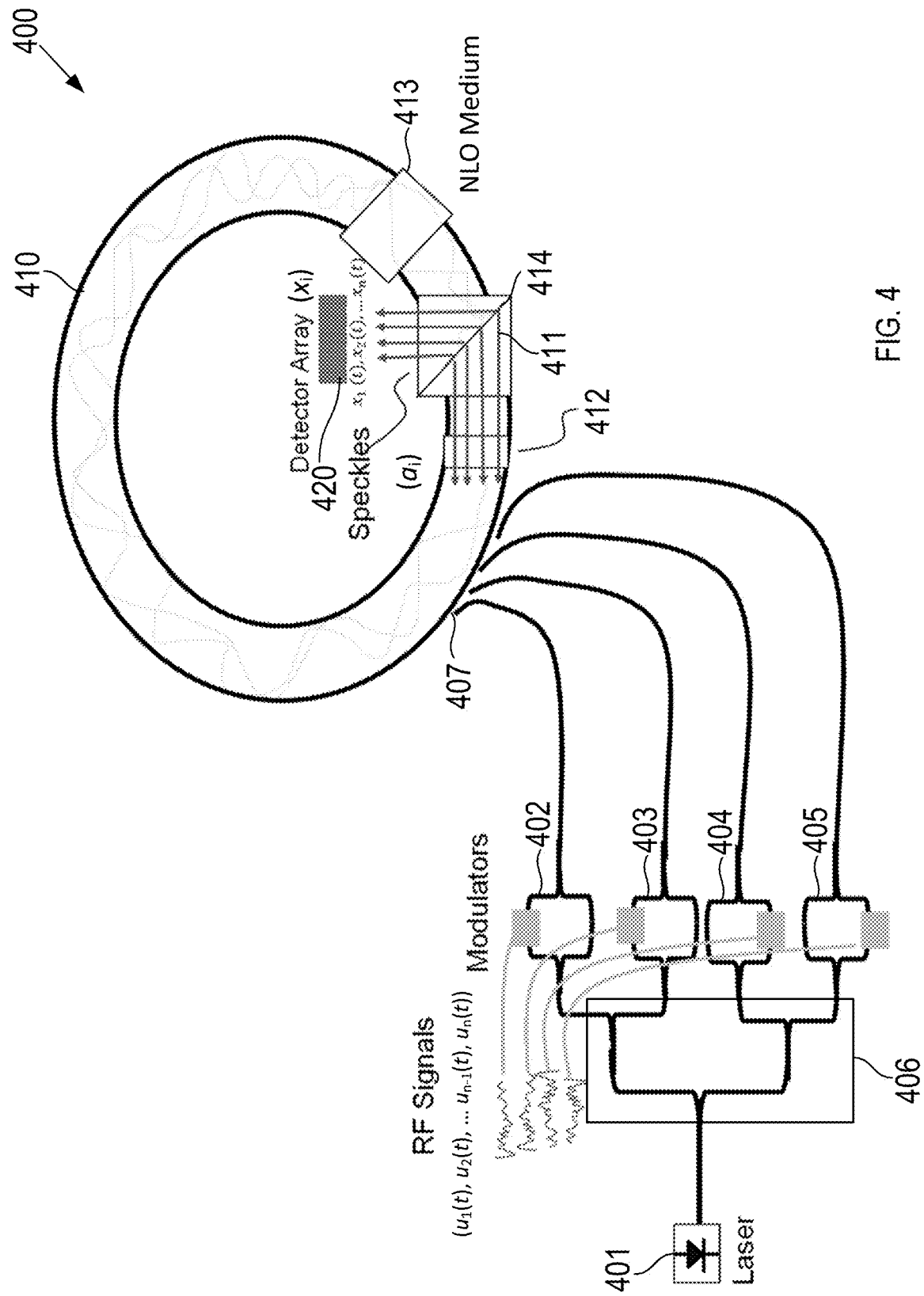
FIG. 4 schematically illustrates components of another reservoir computing circuit including a multi-mode waveguide having multiple propagations therethrough, according to one exemplary configuration.

FIG. 3 schematically illustrates components of another reservoir computing circuit including a multi-mode waveguide 300 having multiple propagations therethrough, according to one exemplary configuration. In the configuration shown in FIG. 3, the multi-mode waveguide includes multi-mode fiber 310 which may allow RC circuit 300 to be implemented in a relatively small area. Illustratively, multi-mode fiber 310 may have a length of about 100 m or less, or about 50 m or less, or about 20 m or less, or about 10 m or less, or about 5 m or less, or about 2 m or less, and may be coiled or spooled so as to allow the entire RC circuit 300 to be implemented in an area of about 2 m$^2$ or less, or about 1 m$^2$ or less, or about 100 cm$^2$ or less, or about 10 cm$^2$ or less. For example, the coil or spool may have a bend radius of about 1 cm to about 100 cm, or about 2 cm to about 50 cm, or about 5 cm to about 50 cm, or about 10 cm to about 20 cm, and potted (e.g., with epoxy) or otherwise secured. Multi-mode fiber 310 may have a diameter of about 10 to 1000 microns, or about 20 to 500 microns, or about 50 to 200 microns. Multi-mode fiber 310 may support at least about 10 modes, at least about 20 modes, at least about 50 modes, or at least about 100 modes, at least about 200 modes, at least about 500 modes, at least about 1000 modes, at least about 10,000 modes, at least about 50,000 modes, at least about 100,000 modes, or at least about 500,000 modes. In one nonlimiting example, multi-mode fiber 310 is commercially purchased from Neufern (East Gransby, Conn.), such as Smart Product Number: MM-S105/125-12A having a numerical aperture (NA) of 0.120 and core diameter of 105 microns, or Smart Product Number: MM-5400/440-12A having a NA of 0.120 and core diameter of 400 microns.

RC circuit 300 may include laser 301 configured to generate laser light, and modulator 302 configured to impose a time-varying input signal u(t) on the laser light. Laser 301 may include a continuous wave, single-frequency laser, or may include a pulsed laser. Modulator 302 may include any suitable intensity and/or phase modulator, such as an electro-optic modulator. Similarly, as described with reference to FIG. 1, imposing the signal on the laser light using a single modulator may be considered to provide a single-dimension input signal that modulates a plurality of optical modes of the fiber. Alternatively, in a manner such as described with reference to FIG. 6, multiple modulators may impose signal(s) on the laser light so as to provide a multiple-dimension input signal on a plurality of optical modes.

Multi-mode fiber 310 is configured to receive the input signal imposed on the laser light, and to propagate the received input signal imposed on the laser light through the waveguide a plurality of times in a plurality of modes that each time they propagate through the fiber 310, in a manner similar to that described with reference to FIG. 1. Optical feedback structure 311, which may include beamsplitter 314, feeds the optical output of multi-mode fiber 310 back into the fiber, such that the light may propagate through the multi-mode fiber a plurality of times in a plurality of modes, and outcouples a portion of the intensity interference pattern of the plurality of modes to detector array 320. Each pixel of the intensity pattern of the modes may correspond to a neuron of RC circuit 300, and the modes may be fed back into multi-mode fiber 310 using optical feedback structure 311. RC circuit 300 also may include variable attenuator 312 which may be disposed within optical feedback structure 311 and configured to control the relative intensity of the feedback modes relative to the new input modes. Illustratively, beamsplitter 314 may be a variable beamsplitter, so as to concurrently perform both beamsplitting and variable attenuation. In some examples, beamsplitter 214 may include an unbalanced 99/1, 90/10, 80/20, or 60/40 beamsplitter, or a 50/50 or Y-splitters. For chip scale implementation, such waveguides can be built in single modes where one multi-mode input gets read in N single mode waveguide and the non-linearly is applied to those N single mode waveguides, spilt with an integrated beam-splitter array where part of the light goes to the readout detectors and the other part acts as feedback neurons.

RC circuit 300 also may include NLO medium 313 configured to nonlinearly activate portions of the spatial intensity pattern of the plurality of modes each time those modes propagate through the multi-mode fiber 310. In the illustrated example, NLO medium 313 includes a saturable optical gain medium, such as a rare earth dopant within multi-mode fiber 310 (e.g., erbium or ytterbium), or rare earth doped fibers within multi-mode fiber 310. The dopant may be distributed throughout multi-mode fiber 310, or may be disposed only within a specified region of the fiber, e.g., at the end of the fiber right before or after the optical feedback structure 311. Alternatively, NLO medium 313 may include a structure that is discrete from multi-mode fiber 310. For example, NLO medium 313 may include a thin layer of saturable absorbers such as carbon nanotubes, 2D materials such as graphene, or polymers; a bulk multi-mode gain crystal embedded within or spliced to multi-mode fiber 310; a crystal of barium borate, lithium niobate, potassium titanyl phosphate, or other material capable of efficient second harmonic generation; or a film of dye or other material capable of efficient two-photon absorption. For nonlimiting examples of NLO activation media doped into, or otherwise coupled to, optical fibers, see the following references, the entire contents of each of which are incorporated by reference herein: Jaskorzynska et al., "Gain saturation and pump depletion in high-efficiency distributed-feedback rare-earth-doped lasers," Optics letters 21(17): 1366-1368 (1996); Desurvire et al., "Gain saturation effects in high-speed, multichannel erbium-doped fiber amplifiers at lambda=1.53 µm," Journal of Lightwave Technology 7(12): 2095-2104 (1989); and Inoue et al., "Gain saturation dependence on signal wavelength in a travelling-wave semiconductor laser amplifier," Electronics Letters 23(7): 328-329 (1987).

RC circuit 300 may include pump laser 303 configured to excite the dopant at a wavelength ($\lambda 1$) which is different than the wavelength ($\lambda 2$) of laser 301, dichroic beamsplitter or fiber combiner 304 configured to combine light from lasers 301, 303 onto a common pathway for introduction to multi-mode fiber 310, and pump filter 321 configured to inhibit light from pump laser 303 from irradiating detector array 320. Alternatively, pump laser 303 may excite NLO medium 313 via the cladding of multi-mode fiber 310, thus avoiding the need for dichroic beamsplitter or fiber combiner 304. Alternatively, if saturable absorbers are used, then pump laser and associated optical components may be omitted. The action of NLO medium 313 (e.g., as excited by pump laser 303) and propagation through the waveguide expands dimensionality of the input signal as received by optical detector array 320 mixes the modes and stabilizes RC circuit 300. The output of optical detector array 320 is provided to a computer and processed as discussed for example using methods well known in the art such as described by Tanaka et al. referenced above. RC circuit 300, which may be considered to include bulk optics RC hardware, may be prepared in any suitable manner, for example, using commercial off the shelf (COTS) components. Illustratively, a packaged device may be built using telecom COTS components such as lasers, modulators, detector arrays, and custom electronics to drive each device. The speckle mixing may be performed using a coiled fiber where the beamsplitting, combining, and attenuation may all be performed using fiber components built on a monolithic racetrack or COTS microscopic optics.

As noted above, the present RC circuits suitably may receive, and perform operations on, an input signal(s) of multiple dimensions. For example, FIG. 4 schematically illustrates components of another reservoir computing circuit including a multi-mode waveguide having multiple propagations therethrough, according to one exemplary configuration. RC circuit 400 illustrated in FIG. 4 may be configured similarly as RC circuit 200, e.g., may include laser 401, planar waveguide 410, optical feedback structure 411 including beamsplitter 414, variable attenuator 412, NLO medium 413 (e.g., a saturable optical gain medium, such as an SOA), and detector array 420, which may be configured similarly as components described with reference to FIG. 2. In the example illustrated in FIG. 4, modulators 402, 403, . . . 404, 405 respectively are configured to impose any suitable number of time-varying input signals $u_1(t), u_2(t), \ldots u_{n-1}(t), u_n(t)$ on the laser light so as to provide a multiple-dimension input signal. Illustratively, RC circuit 400 may include 1×n power splitter 406 providing laser light to each of modulators 402, 403, . . . 404, 405. The time-varying input signals from modulators 402, 403, . . . 404, 405 may be coupled into waveguide 410 in any suitable manner, e.g., using couplers 407 (a single such coupler being labeled in FIG. 4). Coupler(s) 407 may include a single-mode waveguide (such as SOI described previously) with evanescent coupling to planar waveguide 410, or a tapered structure that takes a few modes input to a multimode ring. Alternatively, coupler(s) 407 may include ring resonators where the modulated light from each input signal is coupled into planar waveguide 410, in which case the ring resonators may be fabricated along the planar waveguide. Planar waveguide 410 is configured to receive the multi-dimensional input signal imposed on the laser light, and to propagate the received input signal imposed on the laser light through the waveguide a plurality of times in a plurality of modes that each time they propagate through the waveguide 410, in a manner similar to that described with reference to FIG. 1. The action of NLO medium 413 mixes the modes and stabilizes RC circuit 400. The output of optical detector array 420 is provided to a computer and processed using methods well known in the art, such as described by Tanaka et al. referenced above.

Figure 5:
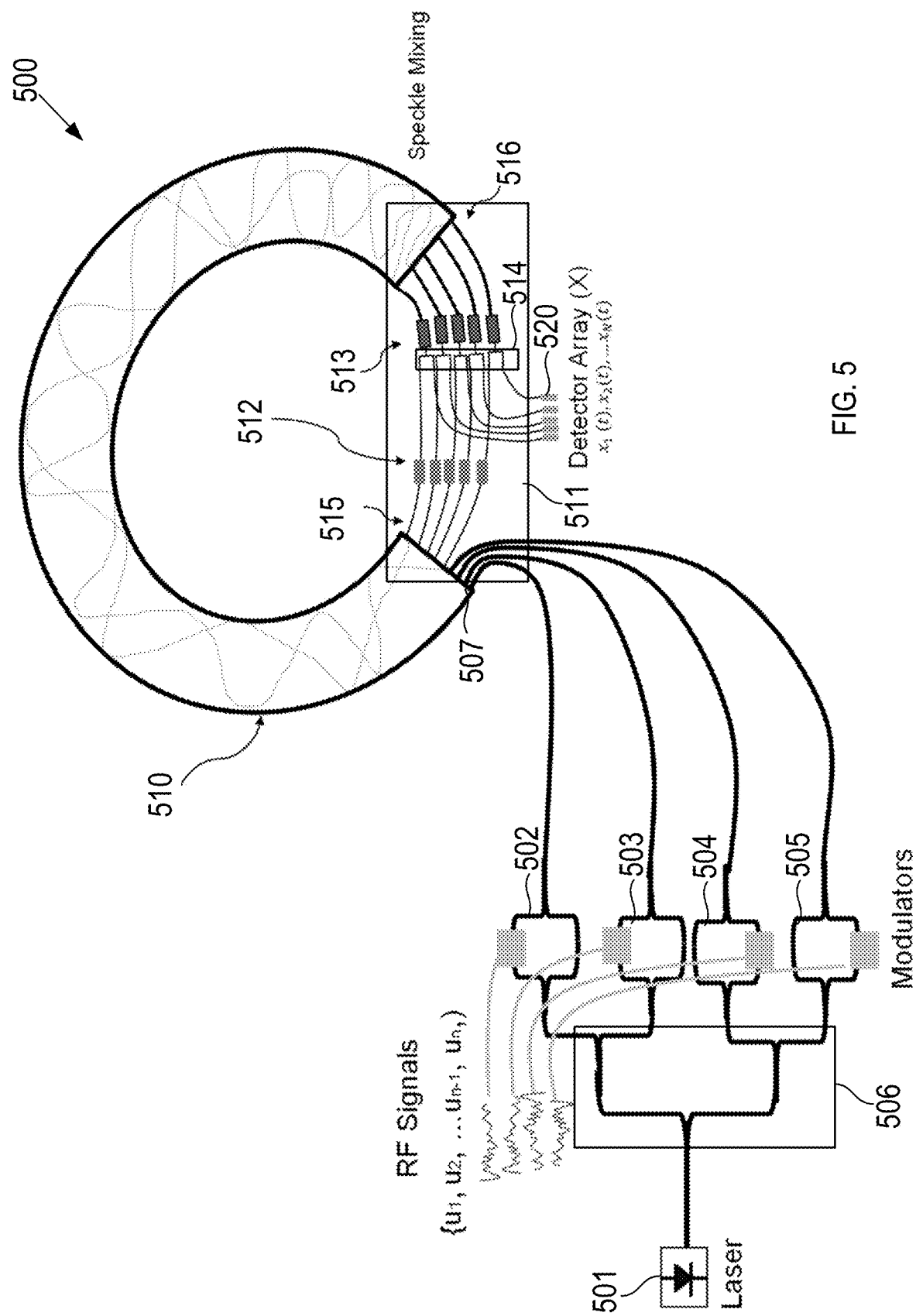
FIG. 5 schematically illustrates components of another reservoir computing circuit including a multi-mode waveguide having multiple propagations therethrough, according to one exemplary configuration.

It will be appreciated that any suitable combination of alternative optical components may be used to perform functions of optical components such as described with reference to FIGS. 2-4. For example, FIG. 5 schematically illustrates components of another reservoir computing circuit including a multi-mode waveguide having multiple propagations therethrough, according to one exemplary configuration. RC circuit 500 illustrated in FIG. 5 may be configured similarly as RC circuit 400, e.g., may include laser 501, modulators 502, 503, . . . 504, 505 respectively configured to impose any suitable number of time-varying input signals $u_1(t), u_2(t), \ldots u_{n-1}(t), u_n(t)$ on the laser light, 1×n power splitter 506 providing laser light to the modulators, coupler 507 providing modulated laser light from the modulators as input to planar waveguide 510, and detector array 520, which may be configured similarly as components described with reference to FIG. 2. Components of RC circuit 500 may include standard foundry PDK components that are widely available. In the example illustrated in FIG. 5, optical feedback structure 511 includes multi-mode to single mode splitter 516 which may include N single mode readout channels corresponding to N neurons; NLO elements 513 each including a NLO medium (e.g., nonlinear gain medium) coupled to a corresponding channel of splitter 516; waveguide interposers 514 each configured to output a first portion of one of the channels to detector array 520 and a second portion back into waveguide 510; and variable attenuators 512 each attenuating the second channel portion received from a corresponding waveguide interposer 514 prior to transmitting that portion back into waveguide 510 via respective single mode waveguides 515. Planar waveguide 510 is configured to receive the multi-dimensional input signal imposed on the laser light, and to propagate the received input signal imposed on the laser light through the waveguide a plurality of times in a plurality of modes that each time they propagate through the waveguide 510, in a manner similar to that described with reference to FIG. 1. The action of waveguide 510 and NLO elements 513 mixes the modes and stabilizes RC circuit 500. The output of optical detector array 520 is provided to a computer and processed using methods well known in the art, such as described by Tanaka et al. referenced above.

Figure 6:
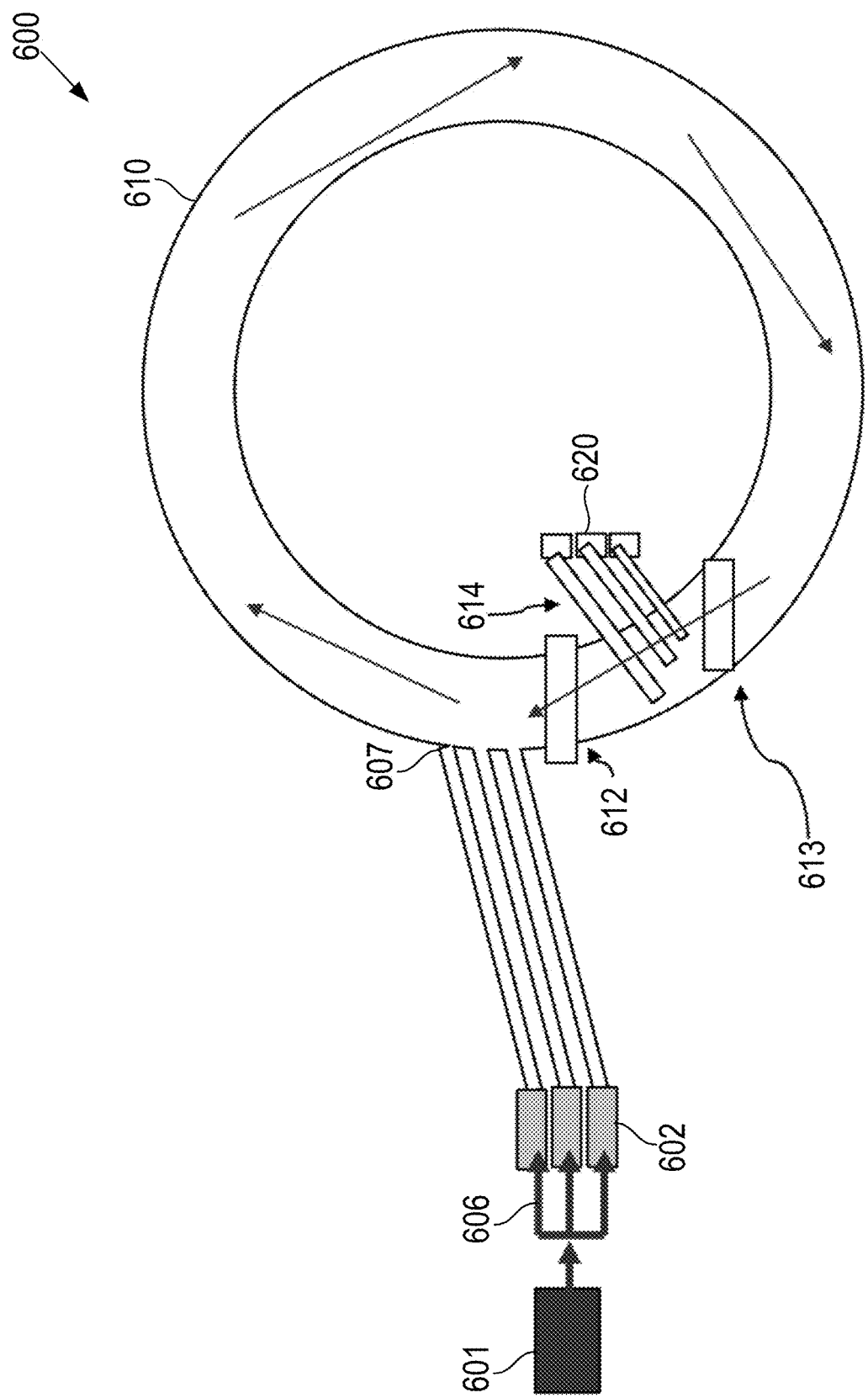
FIG. 6 schematically illustrates components of another reservoir computing circuit including a multi-mode waveguide having multiple propagations therethrough, according to one exemplary configuration.
Figure 7:
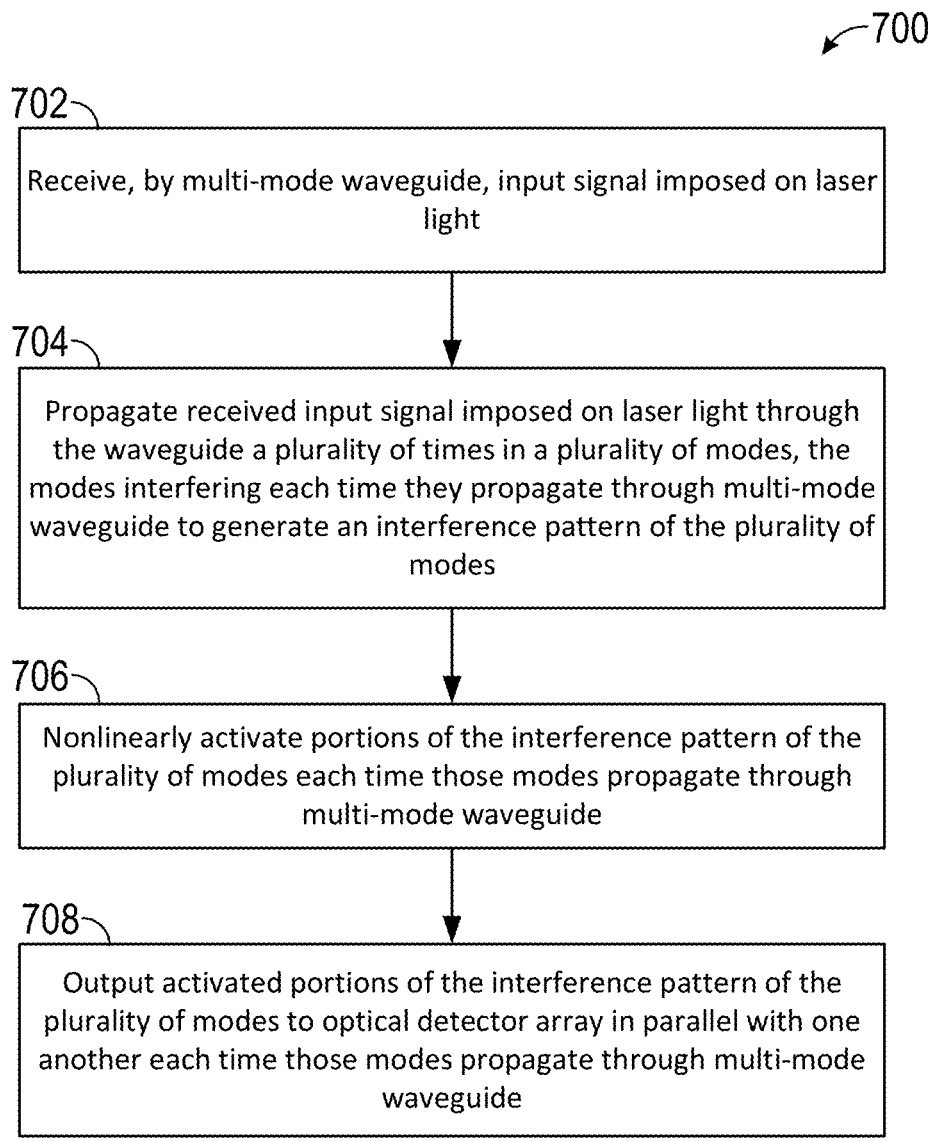
FIG. 7 schematically illustrates a flow of operations for performing reservoir computing operations using multiple propagations through a multi-mode waveguide having multiple propagations therethrough, according to one exemplary configuration.

FIG. 6 schematically illustrates components of another reservoir computing circuit including a multi-mode waveguide having multiple propagations therethrough, according to one exemplary configuration. RC circuit 600 illustrated in FIG. 6 may be configured similarly as RC circuit 300, e.g., may include laser 601, multi-mode fiber 610, and detector array 620, which may be configured similarly as components described with reference to FIG. 3. In the example illustrated in FIG. 6, modulator array 602 including a plurality of modulators is configured to impose any suitable number of time-varying input signals $u_1(t), u_2(t), \ldots u_{n-1}(t), u_n(t)$ on the laser light so as to provide a multiple-dimension input signal. Illustratively, RC circuit 600 may include 1→n power fanout 606 providing laser light to each of the modulators in array 602. The time-varying input signals from the modulators of array 602 may be coupled into multi-mode fiber 610 in any suitable manner, e.g., using couplers 607 (a single such coupler being labeled in FIG. 6). NLO medium 613 may include a saturable optical gain medium, such as a dopant within multi-mode fiber 610 or a structure that is discrete from multi-mode fiber 610, e.g., such as described with reference to FIG. 3. RC circuit 600 may include a pump laser (not specifically illustrated) that is configured similarly as described with reference to FIG. 3. Variable attenuator 612 may be configured similarly as described with reference to FIG. 2. In the example illustrated in FIG. 6, the optical feedback structure includes fiber outputs 614 each configured to output a first portion of modes within multi-mode fiber to detector array 620 and a second portion back into waveguide 610. Planar waveguide 610 is configured to receive the multi-dimensional input signal imposed on the laser light, and to propagate the received input signal imposed on the laser light through the waveguide a plurality of times in a plurality of modes that each time they propagate through the waveguide 610, in a manner similar to that described with reference to FIG. 1. The action of waveguide 610 and NLO elements 613 mixes the modes and stabilizes RC circuit 600. The output of optical detector array 620 is provided to a computer and processed using methods well known in the art, such as described by Tanaka et al. referenced above. RC circuit 600 may be prepared in any suitable manner, for example, using COTS components. Illustratively, a packaged device may be built using telecom COTS components such as lasers, modulators, detector arrays, and custom electronics to drive each device. The speckle mixing may be performed using a coiled fiber where the beamsplitting, combining, and attenuation may all be performed using fiber components built on a monolithic racetrack or COTS microscopic optics It will be appreciated that RC circuits such as described with reference to FIGS. 1-6 may be used to perform any suitable reservoir computing operations. FIG. 7 schematically illustrates a flow of operations for performing reservoir computing operations using multiple propagations through a multi-mode waveguide having multiple propagations therethrough, according to one exemplary configuration. Method 700 illustrated in FIG. 7 includes receiving, by a multi-mode waveguide, the input signal imposed on laser light (operation 702). For example, multi-mode waveguide 110 may receive the input signal that modulator 102 imposes on light from laser 101 in a manner such as described with reference to FIG. 1. Or, for example, planar waveguide 210 may receive the input signal that modulator 202 imposes on light from laser 201 in a manner such as described with reference to FIG. 2. Or, for example, multi-mode fiber 310 may receive the input signal that modulator 302 imposes on light from laser 301 in a manner such as described with reference to FIG. 3. Or, for example, planar waveguide 410 may receive the multi-dimensional input signal(s) that modulators 402, 403, . . . 404, 405 impose on light from laser 401 in a manner such as described with reference to FIG. 4. Or, for example, planar waveguide 510 may receive the multi-dimensional input signal(s) that modulators 502, 503, . . . 504, 505 impose on light from laser 501 in a manner such as described with reference to FIG. 5. Or, for example, multi-mode fiber 610 may receive the multi-dimensional input signal(s) that the modulators of modulator array 602 impose on light from laser 601 in a manner such as described with reference to FIG. 6.

Method 700 illustrated in FIG. 7 includes propagating the received input signal imposed on the laser light through the waveguide a plurality of times in a plurality of modes, the modes interfering each time they propagate through the multi-mode waveguide to generate an interference pattern of the plurality of modes (operation 704). For example, optical feedback structure 111 described with reference to FIG. 1 may repeatedly feed light from the output of multi-mode waveguide 110 back to the input of multi-mode waveguide, and as a result the modes which are generated upon each pass through the multi-mode waveguide may interfere with modes which had been generated upon prior passes through the multi-mode waveguide. Or, for example, optical feedback structure 211 described with reference to FIG. 2 may repeatedly feed light from the output of planar waveguide 210 back to the input of the planar waveguide, and as a result the modes which are generated upon each pass through the planar waveguide may interfere with modes which had been generated upon prior passes through the planar waveguide. Or, for example, optical feedback structure 311 described with reference to FIG. 3 may repeatedly feed light from the output of multi-mode fiber 310 back to the input of the multi-mode fiber, and as a result the modes which are generated upon each pass through the multi-mode fiber may interfere with modes which had been generated upon prior passes through the multi-mode fiber. Or, for example, optical feedback structure 411 described with reference to FIG. 4 may repeatedly feed light from the output of planar waveguide 410 back to the input of the planar waveguide, and as a result the modes which are generated upon each pass through the planar waveguide may interfere with modes which had been generated upon prior passes through the planar waveguide. Or, for example, optical feedback structure 511 described with reference to FIG. 5 may repeatedly feed light from the output of planar waveguide 510 back to the input of the planar waveguide, and as a result the modes which are generated upon each pass through the planar waveguide may interfere with modes which had been generated upon prior passes through the planar waveguide. Or, for example, optical feedback structure 611 described with reference to FIG. 6 may repeatedly feed light from the output of multi-mode fiber 610 back to the input of the multi-mode fiber, and as a result the modes which are generated upon each pass through the multi-mode fiber may interfere with modes which had been generated upon prior passes through the multi-mode fiber.

Method 700 illustrated in FIG. 7 includes nonlinearly activating portions of the interference pattern of the plurality of modes each time those modes propagate through the multi-mode waveguide (operation 706). For example, NLO medium 113 described with reference to FIG. 1 may nonlinearly activate portions of the interference pattern of modes on each pass through multi-mode waveguide 110. Or, for example, NLO medium 213 described with reference to FIG. 2 may nonlinearly activate portions of the interference pattern of modes on each pass through planar waveguide 210. Or, for example, NLO medium 313 described with reference to FIG. 3 may nonlinearly activate portions of the interference pattern of modes on each pass through multi-mode fiber 310. Or, for example, NLO medium 413 described with reference to FIG. 4 may nonlinearly activate portions of the interference pattern of modes on each pass through planar waveguide 410. Or, for example, NLO medium 513 described with reference to FIG. 5 may nonlinearly activate portions of the interference pattern of modes on each pass through planar waveguide 510. Or, for example, NLO medium 613 described with reference to FIG. 6 may nonlinearly activate portions of the interference pattern of modes on each pass through multi-mode fiber 610.

Method 700 illustrated in FIG. 7 includes outputting portions of the activated interference pattern of the plurality of modes to an optical detector array in parallel with one another each time those modes propagate through the multi-mode waveguide (operation 708). For example, outcoupler 114 described with reference to FIG. 1 may output portions of the interference pattern to detector array 120 in parallel with one another. Or, for example, beamsplitter 214 described with reference to FIG. 2 may output portions of the interference pattern to detector array 220 in parallel with one another. Or, for example, beamsplitter 314 described with reference to FIG. 3 may output portions of the interference pattern to detector array 320 in parallel with one another. Or, for example, beamsplitter 414 described with reference to FIG. 4 may output portions of the interference pattern to detector array 420 in parallel with one another. Or, for example, waveguide interposers 515 described with reference to FIG. 5 may output portions of the interference pattern to detector array 520 in parallel with one another. Or, for example, fiber outputs 614 described with reference to FIG. 6 may output portions of the interference pattern to detector array 620 in parallel with one another. Such outputs may be processed, e.g., amplified, digitized, and provided to a computer processor or dedicated circuit applying RC techniques such as described in Tanaka et al.

It will be appreciated that various components of the present RC circuits may be custom fabricated, or may individually commercially available and suitably combined with one another using the present teachings. For example, lasers suitable for use in the present RC circuits may include on-board or external components that may be coupled to a multi-mode waveguide (e.g., which is disposed on a photonic chip) through edge coupling, grating coupling, or direct focusing using free-space optics. Modulators suitable for use in the present RC circuits may include electro-optical amplitude modulators, electro-optical phase modulators, absorption modulators, ring modulators, or direct current modulated laser arrays. Example signal inputs include RF signal feedthrough via bnc/SMA connectors, on-chip Vivaldi antennas, digital signals from external RF drivers, computer memory, and the like. Example power splitters include cascaded Y-splitters, multi-mode interference (MMI) splitters, and star couplers. Example demultiplexers such as may be used to couple signals to or from multi-mode waveguides include multimode converters, adiabatic couplers, star couplers, cascaded asymmetrical directional couplers, single modes fused to multimode waveguides, or providing laser light from one fiber of a tapered fiber bundle. Example variable attenuators include heater-based variable optical attenuator (VOA) for bulk, or single element VOAs for single mode waveguides. In various configurations provided herein, the multi-mode waveguides may be configured as a spiral, a single, loop, rectangular, or any other suitable shape. Illustratively, couplers 407, 507, 607 may include any suitable optical component for coupling input signal(s) into a planar waveguide or multi-mode fiber, e.g., a waveguide crossing or a mode multiplexer such as an evanescent coupling base, multiple ring resonator, fused Y-junction, or the like. Similarly, output signals may be transmitted from a planar waveguide or multi-mode fiber to a detector array using any suitable optical component, e.g., waveguide crossing or a mode multiplexer such as an evanescent coupling base, multiple ring resonator, fused Y-junction, or the like. Example nonlinear gain media include SOAs, including InP SOAs on silicon, InGaAsP/InP SOAs, erbium-based doped waveguide/fibers, ytterbium-based doped waveguide/fibers, erbium/ytterbium-based co-doped waveguide/fibers, and III-V-on-silicon optical amplifiers. Example detector arrays include on-chip-fabricated detectors such as Ge on Si, external detector arrays coupled using an N array of grating or edge couplers, 1D or 2D large arrays, camera arrays, focal-plane arrays and the like.

For a nonlimiting example of an evanescent coupling base, see Yu et al., "Silicon chip-scale space-division multiplexing: from devices to system," Science China Information Sciences 61: 080403 (2018), the entire contents of which are incorporated by reference herein. For nonlimiting examples of silicon optical amplifiers (SOAs), such as may be used as nonlinear gain media, see Keyvaninia et al., "A highly efficient electrically pumped optical amplifier integrated on an SOI waveguide circuit," The 9th International Conference on Group IV Photonics (GFP), San Diego, Calif.: 222-224 (2012), the entire contents of which are incorporated by reference herein. For examples of SOAs and examples of flip-chip bonded integration of an SOA with other photonic components, see Doany et al., "A four-channel silicon photonic carrier with flip-chip integrated semiconductor optical amplifier (SOA) array providing >10-dB gain," 2016 IEEE 66th Electronic Components and Technology Conference (ECTC), Las Vegas, Nev.: 1061-1068 (2016); and Matsumoto et al., "Hybrid-integration of SOA on silicon photonics platform based on flip-chip bonding," Journal of Lightwave Technology 37(2): 307-313 (2019); and Rönn et al., "Ultra-high on-chip optical gain in erbium-based hybrid slot waveguides," Nature Communications 10: 432 (2019); the entire contents of each of which are incorporated by reference herein. For a nonlimiting example of a waveguide crossing, see Jones et al., "Ultra-low crosstalk, CMOS compatible waveguide crossings for densely integrated photonic interconnection networks," Optics Express 21(10): 12002-12013 (2013), the entire contents of which are incorporated by reference herein. For a nonlimiting example of a detector, see Yin et al., "31 GHz Ge n-i-p waveguide photodetectors on Silicon-on-Insulator substrate," Optics Express, 15(21): 13965-13971 (2007), the entire contents of which are incorporated by reference herein. For nonlimiting examples of MMI splitters, see Li et al., "Multimode silicon photonics," Nanophotonics 8(2): 227-247 (2019), the entire contents of which are incorporated by reference herein. For nonlimiting examples of heater-based VOAs for bulk, see Yu et al., "The 650-nm variable optical attenuator based on polymer/silica hybrid waveguide," Chinese Physics B 25(5): 054101 (2016).

Working Examples

The following examples are intended to be nonlimiting, and purely illustrative of the present invention.

Figure 8:
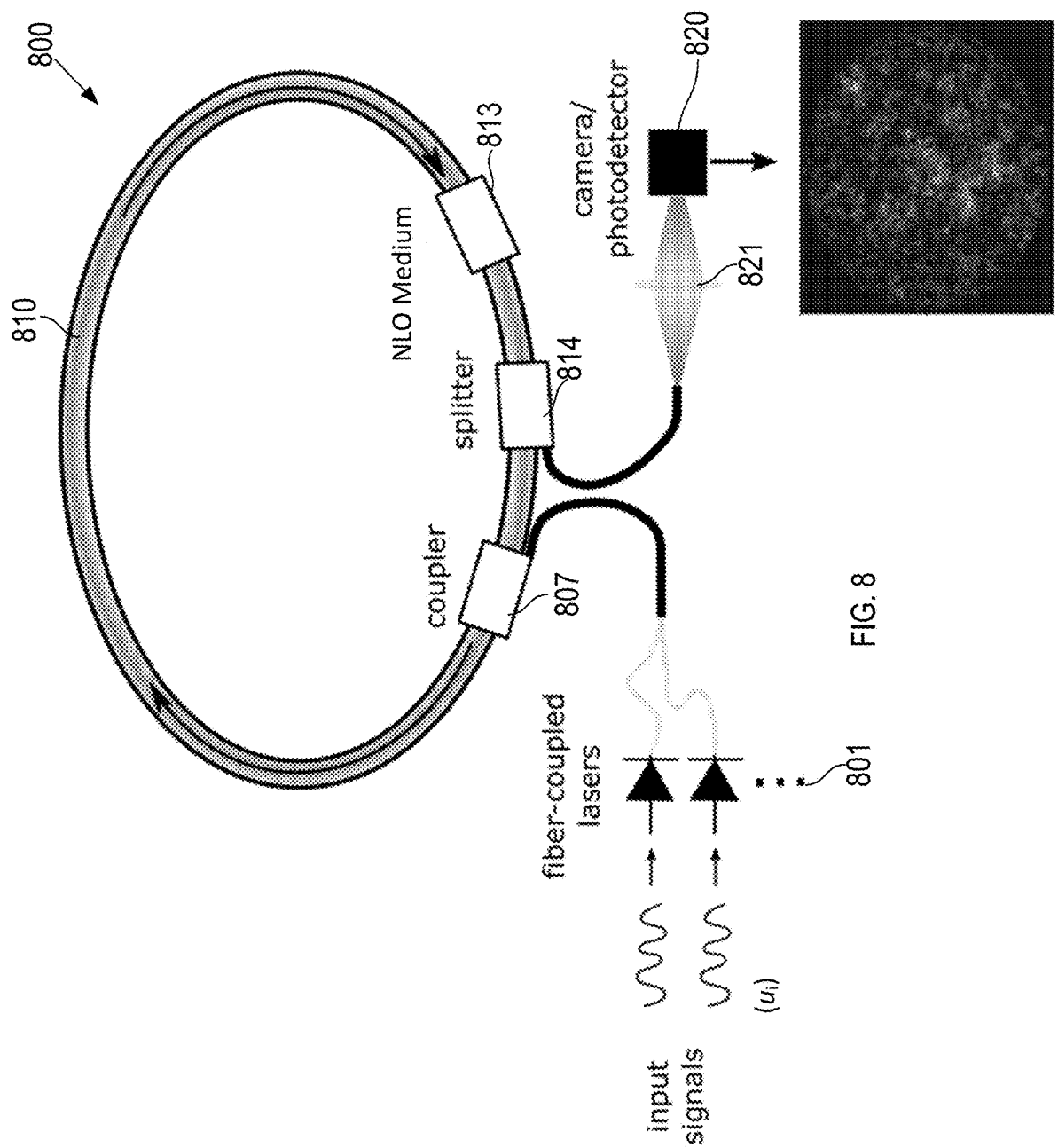
FIG. 8 schematically illustrates components of a simulated reservoir computing circuit used to classify and predict a Mackey-Glass time series, according to one exemplary configuration.

To assess performance of the present RC circuits, the exemplary RC circuit illustrated in FIG. 8 was simulated for use in classifying and predicting a Mackey-Glass time series. Example results of such predictions are described below with reference to FIGS. 9A-9B, 10A-10B, 11, and 12A-12C.

Simulated RC circuit 800 illustrated in FIG. 8 includes multi-mode fiber 810, a plurality of fiber-coupled lasers that are direct current modulated so as respectively to impose time-varying input signals $u_1(t)$, $u_2(t)$, ... $u_{n-1}(t)$, $u_n(t)$ on the light from such lasers, and couplers 807 configured to introduce modulated laser light from the lasers as input to multi-mode fiber 810. Multi-mode fiber 810 generates a plurality of modes that propagate through saturable absorber 813 which acts as a NLO medium. Splitter 814 then directs a portion of the modes to free space lens 821 which focuses the speckle pattern from multi-mode fiber 810 onto camera/photodetector 820, while allowing another portion of the modes to circulate back through multi-mode fiber 810 again. Splitter 814 also functions as a variable attenuator. The resulting simulated speckle pattern was used to perform reservoir computing operations. Lasers 801 were simulated to have a single wavelength at 1064 nm, and the multi-mode fiber 810 was simulated to have a 200 micron diameter and a 0.39 NA, and to support approximately 13,000 transverse modes at the laser wavelength. The number of spatial points was set to be 49,125 pixels.

The simulations were performed in a manner similar to that described in Paudel et al., "Classification of time-domain waveforms using a speckle-based optical reservoir computer," Optics Express 28(2): 1225-1237 (2020), the entire contents of which are incorporated by reference herein. A ring resonator propagation matrix W was calculated using field mode matrix M (dimension: number of pixels×number of modes) and propagation constants β (dimension: number of modes×number of modes diagonal) using equation (3):

$$W = M\beta M^\dagger \quad (3)$$

where † indicates the pseudoinverse operation. Inputs were mapped to pixels using c (dimension: number of pixels× number of inputs+1) and the input matrix $W_{in}$ calculated using equation (4):

$$W_{in} = Wc \quad (4).$$

The network then was propagated, and the field at splitter 814 calculated using equation (5):

$$x_{n+1} = f_{NL}(W_{in}u_n + Wx_n\sqrt{1-a}) \quad (5)$$

where a was imposed by a variable splitter, and $f_{NL}(\ )$ approximated the action of a saturable absorber in a manner similar to a leaky reLU function:

$$f_{NL}(z) = \text{Arg}(z) \times \sqrt{\max\left\{\frac{zz^* - \delta}{\epsilon zz^*}\right\}}. \quad (6)$$

where z is a placeholder for the argument of $f_{NL}(\ )$ while δ controls the location of the break point and ϵ controls the slope in the reLU. The vector of inputs at time point n+bias term γ was given by:

$$u(t) = [\gamma, u(0), u(1), \ldots] \quad (7).$$

In a manner such as known in the art (see Schrauwen et al. referenced above), bias term γ may be used in RCs to improve performance by adjusting the relative magnitudes of the terms inside the nonlinear function, and may be implemented by inputting an additional u(t) signal that is constant.

The results were collected and the intensity calculated at each pixel of photodetector 820:

$$X = a[x(0)x^*(0), \ldots ;x(N-1)x^*(N-1)] \quad (8)$$

(dimension: number of time points×number of pixels). The RC circuit was trained on data, truncating X as necessary, using equation (9):

$$w_{out} = X_{train}^\dagger y_{train} \quad (9)$$

where † indicates the pseudoinverse operation.
The performance of the RC circuit then was evaluated using equation (10):

$$y_{pred} = X_{test} w_{out} \quad (10).$$

Additionally, several parameters of the simulated RC circuit 800 illustrated in FIG. 8 were controlled so as to assess the impact, if any, of such parameters on the reservoir computing operations. Such parameters may also be referred to as "hyperparameters," and include:

Input laser power—controls the levels of the input signals u(t);

Input bias power—controls the level of the bias relative to the input signal;

Fraction of power diverted to photodetector—referred to elsewhere herein as a;

Distributed loss in waveguide;

Nonlinear gain or attenuation medium—class: saturable absorber (e.g., semiconductor, quantum dot, carbon nanotube, doped crystal) or saturable gain medium (e.g., SOA, optically-pumped fiber, optically-pumped crystal), location: at beginning of waveguide just after input u(t), at end of waveguide just prior to coupling to detector, or distributed through waveguide, and saturation intensity;

(Round-trip time of light in waveguide)/(sampling period of input signal) for digitally sampled u(t) or (round-trip time)fmax where fmax is the maximum frequency of the analog signal u(t);

Class of multi-mode planar waveguide or fiber: passive strongly guiding multi-mode waveguide, passive weakly guiding multi-mode fiber, fiber bundle, multimode fiber with gain, or micro structured optical fiber (index guided or photonic crystal fiber);

scaling;

γ—bias/input channel weight ratio;

δ—leaky reLU leakage;

number of modes in fiber; and number of pixels in field sampled.

Figure 9A:
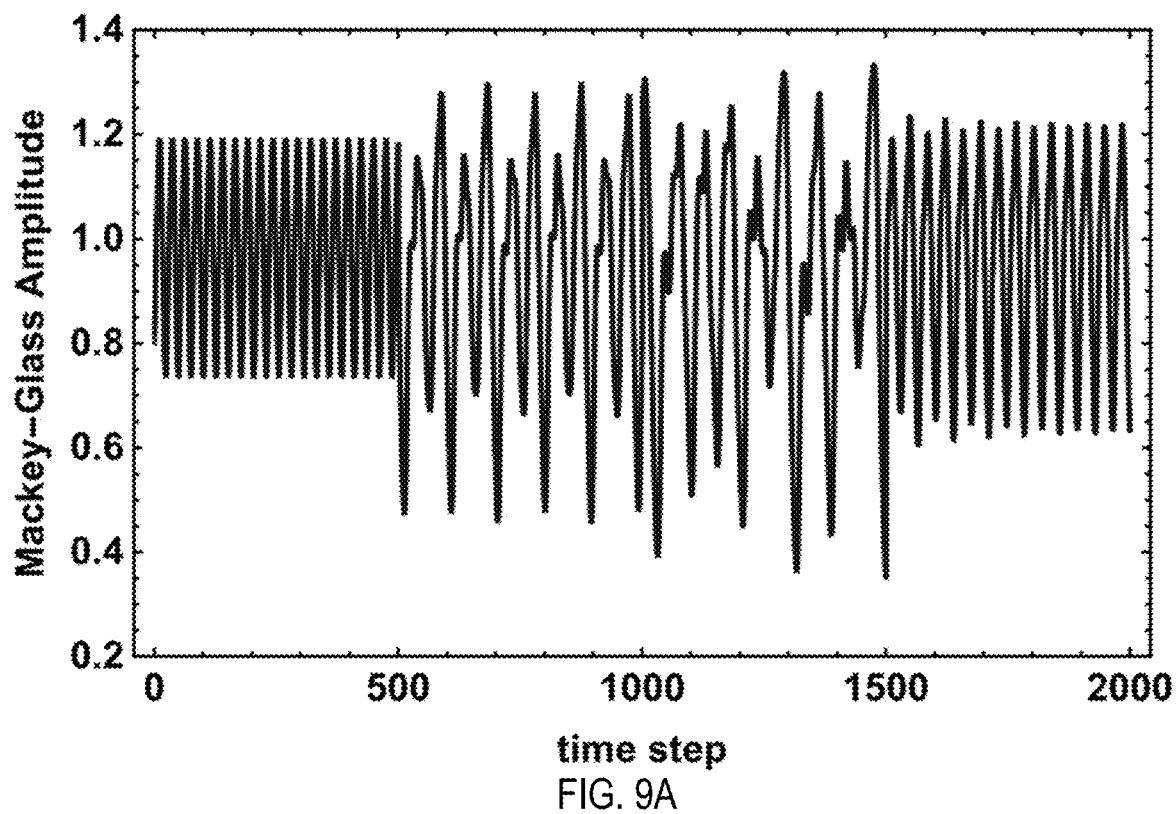
FIGS. 9A-9B are plots illustrating replication, by reservoir computing operations, of a Mackey-Glass time series.
Figure 9B:
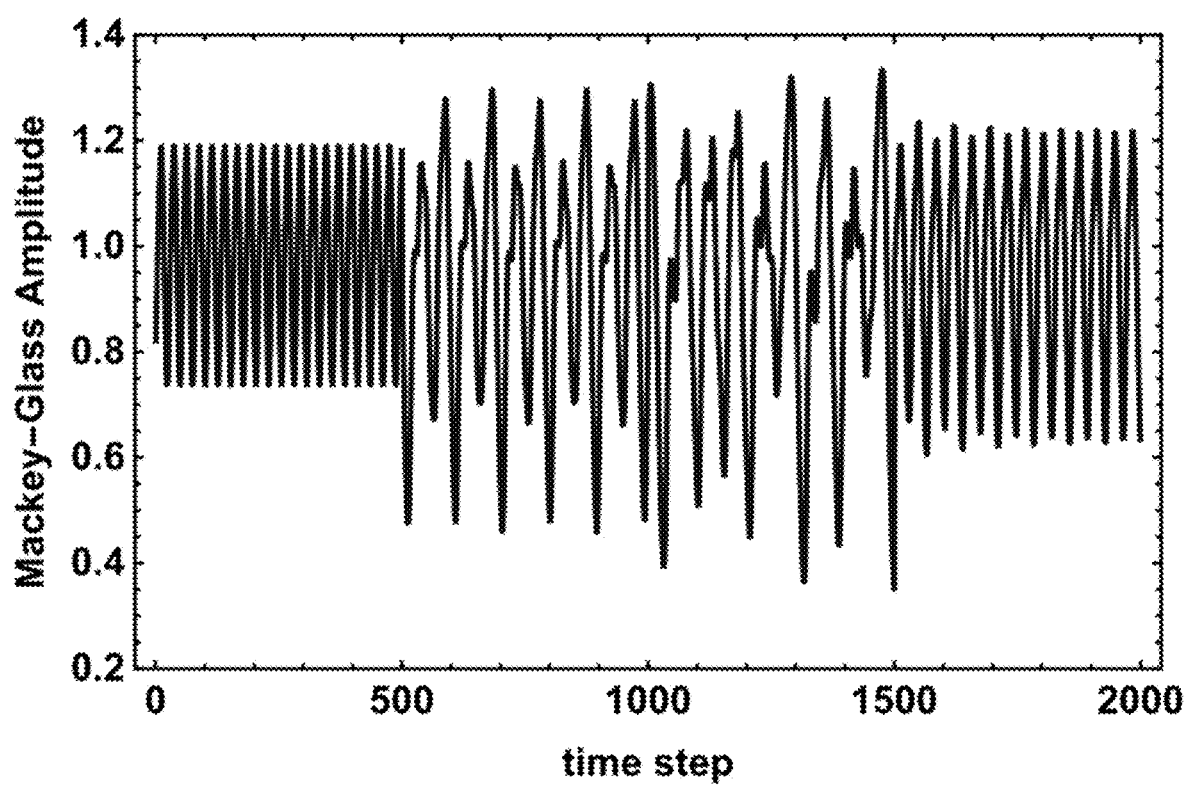
Figure 10A:
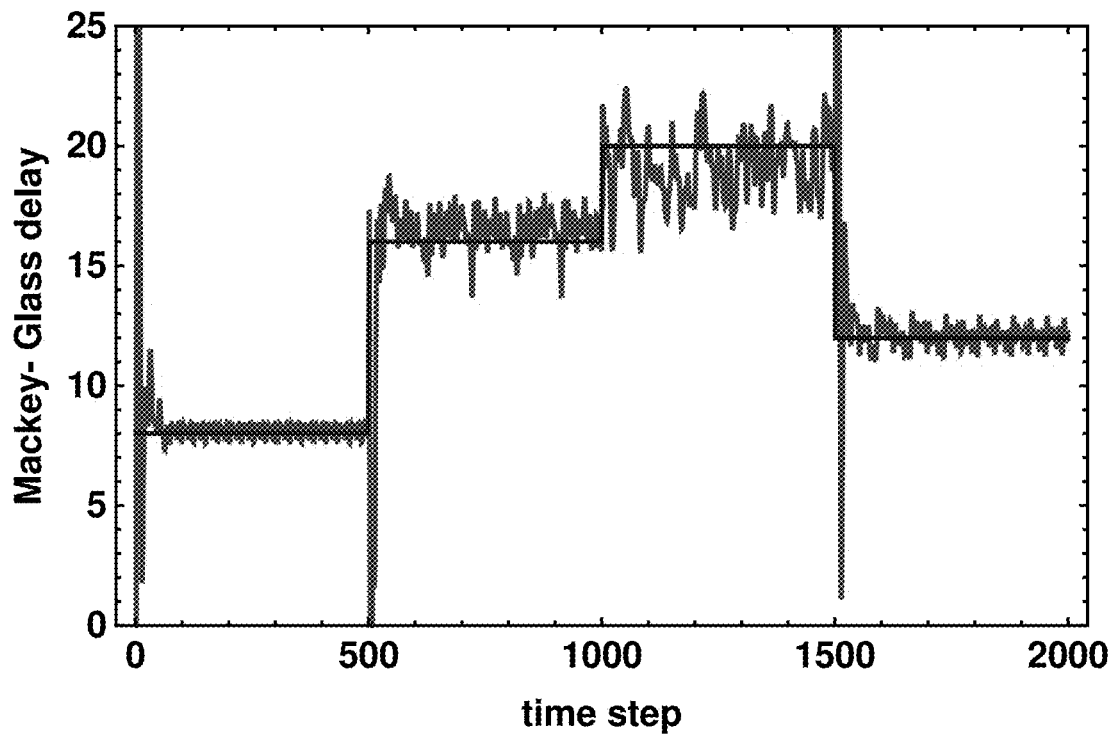
FIGS. 10A-10B are plots illustrating classification, by reservoir computing operations, of the delay of a Mackey-Glass time series.
Figure 10B:
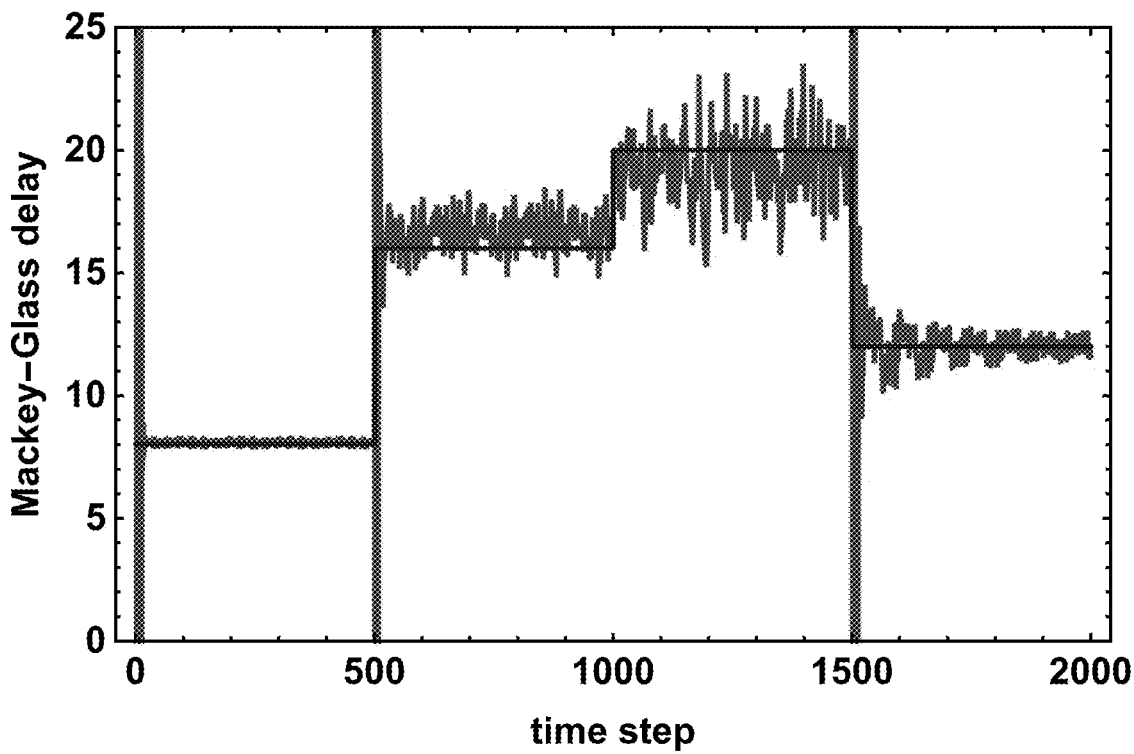

FIGS. 9A-9B are plots illustrating replication, by reservoir computing operations, of a Mackey-Glass time series. FIG. 9A illustrates Mackey-glass waveform recovery using a conventional digital RC, while FIG. 9B illustrates Mackey-glass waveform recovery using a circular planar RC circuit such as RC circuit 200 illustrated in FIG. 2 and RC circuit 300 illustrated in FIG. 3. The input signal and the reconstructed signal aligned well for both types of RC. FIGS. 10A-10B are plots illustrating classification, by reservoir computing operations, of the delay of a Mackey-Glass time series. FIG. 10A illustrates signal classification by a conventional digital RC of a Mackey-glass waveform with unknown delay after training with known delays, while FIG. 10B illustrates signal classification by a circular planar RC circuit such as RC circuit 200 illustrated in FIG. 2 and RC circuit 300 illustrated in FIG. 3, of the same Mackey-glass waveform with unknown delay after training with known delays. From FIGS. 9A-9B and 10A-10B, it may be understood that the performance of the circular planar RC circuit was essentially the same as that of the conventional digital RC with the same number of neurons.

Figure 11:
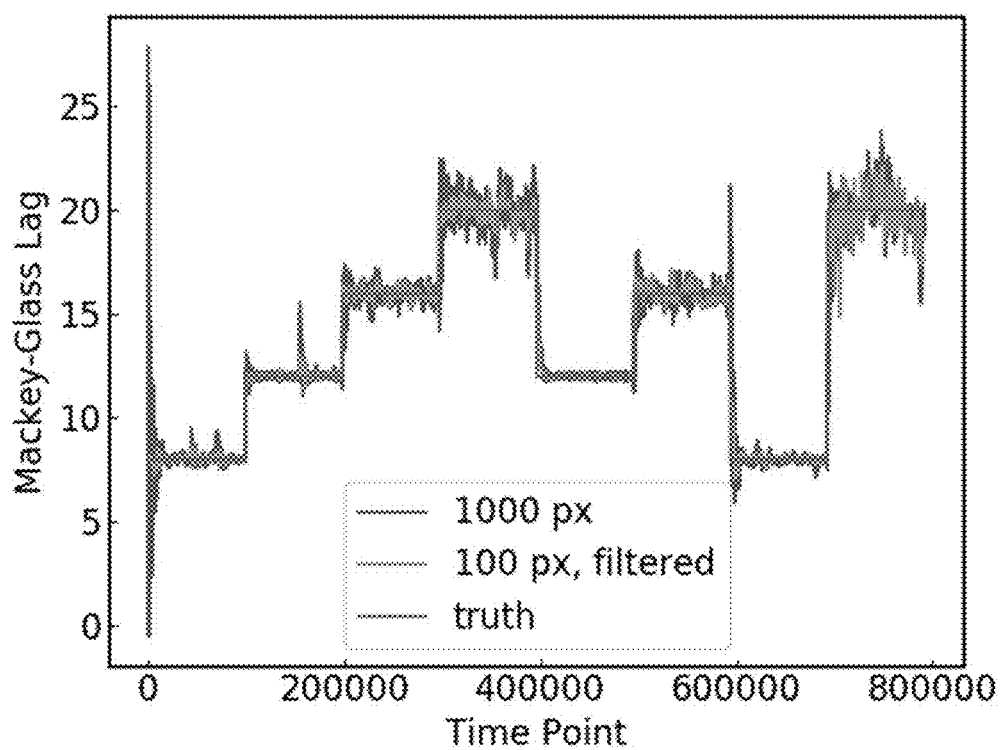
FIG. 11 is a plot illustrating classification, by reservoir computing operations, of the delay of a Mackey-Glass time series.

Other examples of the performance of the devices such as described in this application are shown in FIGS. 11 and 12A-12C, which simulate the performance of the reservoir computer 800 shown in FIG. 8. Similar to the performance shown in FIG. 10B, FIG. 11 is a plot illustrating classification, by reservoir computing operations, of the delay of a Mackey-Glass time series using reservoir computer 800. FIG. 11 illustrates the improvement in classification in going from 256 modes to 13000 modes in fiber 810 of reservoir computer 800. It is known to those skilled in the art that the number of modes in a fiber can be increased by increasing the diameter of the fiber or by changing the numerical aperture of the fiber.

Figure 12A:
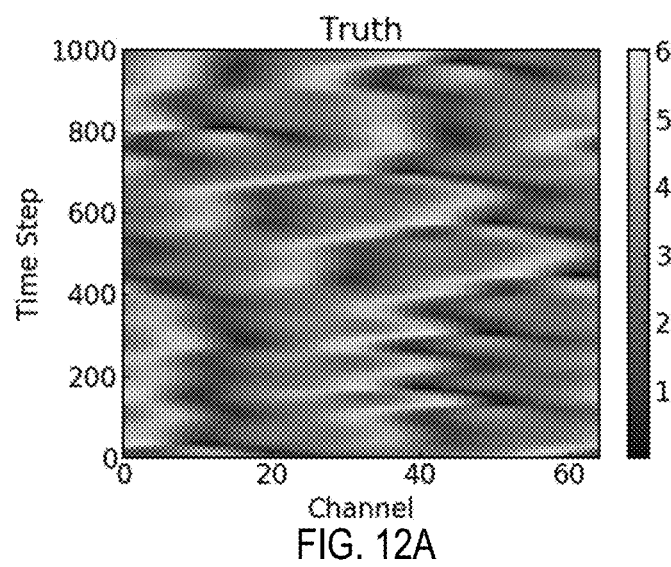
FIGS. 12A-12C are plots illustrating prediction, by reservoir computing operations, of a solution to the Kuramoto-Sivashinsky equation.
Figure 12B:
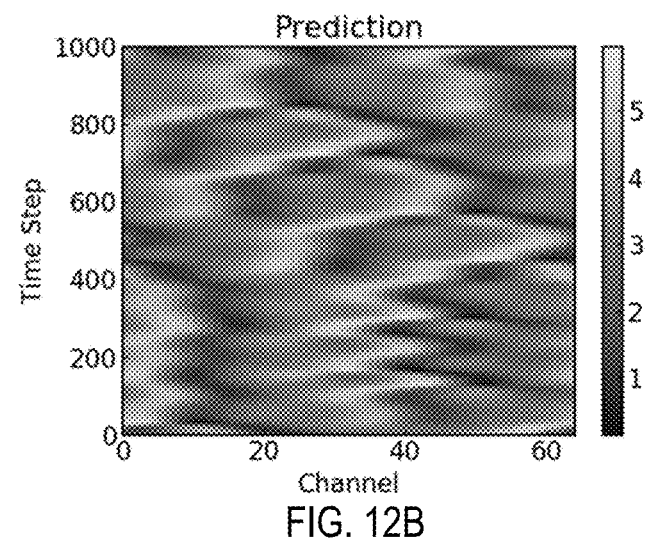
Figure 12C:
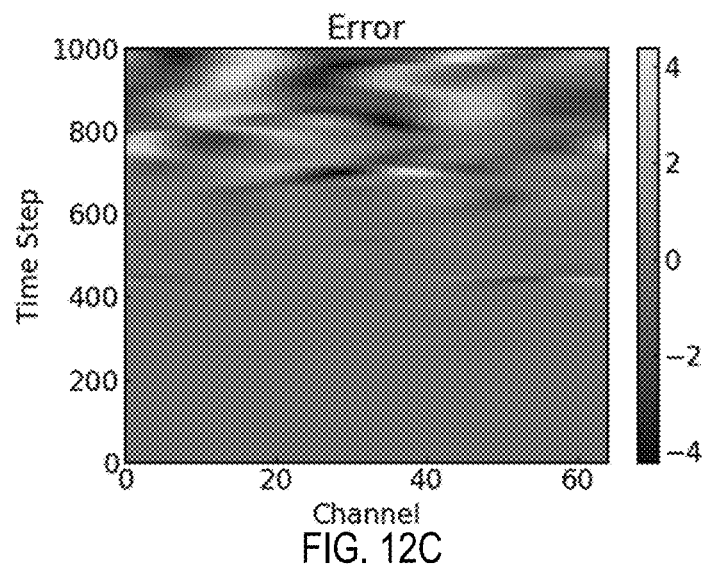

FIGS. 12A-12C are plots illustrating prediction, by reservoir computing operations, of a solution to the Kuramoto-Sivashinsky equation. The Kuramoto-Sivashinsky equation is described by Pathak et al., "Model-free prediction of large spatiotemporally chaotic systems from data: A reservoir computing approach" *Physical review letters* 120(2): 024102 (2018). Predicting solutions to the Kuramoto-Sivashinsky equation is known to be a severe test for reservoir computers and the exemplary performance shown in FIGS. 12A-12C demonstrates that device 800 illustrated in FIG. 8 improves on the existing state of the art for reservoir computers. For each test illustrated in FIGS. 12A-12C, the network yields a prediction for the 2D waveform. This example was the median performer out of the 100 tests. A typical prediction begins to drift off around time point 500-600 and completely loses the waveform around point 600-700. The average case shows far superior performance to literature examples, which is attributed to the large number of effective neurons possible in this system 800. In the examples shown in FIGS. 12A-12C, the axes are switched from the literature examples and the predictions are run for two times as many time points. The literature examples were taken from Dong et al., referenced above, as well as in the following references, the entire contents of each of which are incorporated by reference herein: Vlachas et al., "Data-driven forecasting of high-dimensional chaotic systems with long short-term memory networks," Proceedings of the Royal Society A: Mathematica, Physical and Engineering Sciences 474(2213): 20170844 (2018), and Vlachas et al., "Forecasting of spatio-temporal chaotic dynamics with recurrent neural networks: A comparative study of reservoir computing and backpropagation algorithms," arXiv preprint arXiv:1910.05266 (2019).

Other Examples

While preferred embodiments of the invention are described herein, it will be apparent to one skilled in the art that various changes and modifications may be made. For example, it should be apparent that the apparatus and methods provided herein suitably may be used to perform any suitable type of computing operation, and are not limited to use in reservoir computing. The appended claims are intended to cover all such changes and modifications that fall within the true spirit and scope of the invention.

What is claimed is:

1. A method for performing an operation on an input signal, the method comprising:

receiving, by a multi-mode waveguide, the input signal imposed on laser light;

propagating the received input signal imposed on the laser light through the waveguide a plurality of times in a plurality of modes, the modes interfering each time they propagate through the waveguide to generate an interference pattern of the plurality of modes;

nonlinearly activating portions of the interference pattern of the plurality of modes each time those modes propagate through the multi-mode waveguide; and outputting, to an optical detector array, activated portions of the interference pattern of the plurality of modes in parallel with one another each time those modes propagate through the multi-mode waveguide.

2. The method of claim 1, wherein the nonlinear activation comprises nonlinear attenuation performed by a saturable optical attenuation medium.

3. The method of claim 1, wherein the nonlinear activation comprises nonlinear gain performed by a saturable optical gain medium.

4. The method of claim 1, wherein the nonlinear activation is performed using a dopant within the multi-mode waveguide.

5. The method of claim 1, wherein the nonlinear activation is performed using a crystal spliced to the multi-mode waveguide.

6. The method of claim 1, wherein the nonlinear activation comprises second harmonic generation or two-photon absorption.

7. The method of claim 1, wherein the multi-mode waveguide comprises a planar waveguide.

8. The method of claim 1, wherein the multi-mode waveguide comprises a multi-mode fiber.

9. The method of claim 1, wherein the portions outputted to the optical detector array map the input signal into a higher dimensional space.

10. The method of claim 1, wherein the input signal extends over a time period longer than a time it takes for the modes to propagate once through the multi-mode waveguide.

11. The method of claim 1, wherein the plurality of modes comprises greater than 10 modes.

12. An apparatus for performing an operation on an input signal, the apparatus comprising:

a multi-mode waveguide configured to receive the input signal imposed on laser light, the waveguide further configured to propagate the received input signal imposed on the laser light through the waveguide a plurality of times in a plurality of modes, the modes interfering each time they propagate through the waveguide to generate an interference pattern of the plurality of modes;

a nonlinear optical medium configured to nonlinearly activate portions of the interference pattern of the plurality of modes each time those modes propagate through the multi-mode waveguide; and an optical detector array configured to receive output activated portions of the interference pattern of the plurality of modes in parallel with one another each time those modes propagate through the multi-mode waveguide.

13. The apparatus of claim 12, wherein the nonlinear optical medium comprises a saturable optical attenuation medium.

14. The apparatus of claim 12, wherein the nonlinear optical medium comprises a saturable optical gain medium.

15. The apparatus of claim 12, wherein the nonlinear optical medium comprises a dopant within the multi-mode waveguide.

16. The apparatus of claim 12, wherein the nonlinear optical medium comprises a crystal spliced to the multi-mode waveguide.

17. The method of claim 12, wherein the nonlinear optical medium comprises a second harmonic generation medium or two-photon absorption medium.

18. The apparatus of claim 12, wherein the multi-mode waveguide comprises a planar waveguide.

19. The apparatus of claim 12, wherein the multi-mode waveguide comprises a multi-mode fiber.

20. The apparatus of claim 12, wherein the portions outputted to the optical detector array map the input signal into a higher dimensional space.

21. The apparatus of claim 12, wherein the input signal extends over a time period longer than a time it takes for the modes to propagate once through the multi-mode waveguide.

22. The apparatus of claim 12, wherein the plurality of modes comprises greater than 10 modes.

* * * * *